US012663690B2

(12) United States Patent
Guha et al.

(10) Patent No.: US 12,663,690 B2
(45) Date of Patent: Jun. 23, 2026

(54) HERALDED PHOTONIC ENTANGLEMENT SOURCE

(71) Applicant: Arizona Board of Regents on Behalf of the University of Arizona, Tucson, AZ (US)

(72) Inventors: Saikat Guha, Tucson, AZ (US); Prajit Dhara, Tucson, AZ (US)

(73) Assignee: Arizona Board of Regents on Behalf of the University of Arizona, Tucson, AZ (US)

(*) Notice: Subject to any disclaimer, the term of this patent is extended or adjusted under 35 U.S.C. 154(b) by 333 days.

(21) Appl. No.: 18/291,617

(22) PCT Filed: Jul. 26, 2022

(86) PCT No.: PCT/US2022/038321
§ 371 (c)(1),
(2) Date: Jan. 24, 2024

(87) PCT Pub. No.: WO2023/009507
PCT Pub. Date: Feb. 2, 2023

(65) Prior Publication Data
US 2024/0295792 A1 Sep. 5, 2024

Related U.S. Application Data

(60) Provisional application No. 63/203,725, filed on Jul. 29, 2021.

(51) Int. Cl.
G02F 1/35 (2006.01)
G02F 3/02 (2006.01)

(52) U.S. Cl.
CPC .......... G02F 1/3526 (2013.01); G02F 1/3517 (2013.01); G02F 1/3534 (2013.01); G02F 3/02 (2013.01); *G02F 1/3536* (2013.01)

(58) Field of Classification Search
CPC .... G02F 1/3517; G02F 1/3526; G02F 1/3534; G02F 1/3536; G02F 3/02
See application file for complete search history.

(56) References Cited

U.S. PATENT DOCUMENTS

| | | | | |
|---|---|---|---|---|
| 8,536,508 B2* | 9/2013 | Peters | ................... | H04B 10/70 |
| | | | | 359/107 |
| 9,680,452 B1* | 6/2017 | Abdo | .................... | H04B 10/70 |

(Continued)

OTHER PUBLICATIONS

Bernien et al., "Heralded entanglement between solid-state qubits separated by 3 meters", Nature 497, pp. 86-90, Publication [online], Dec. 26, 2012, Site Visited [Nov. 11, 2022], Retrieved from Internet URL: https://www.nature.com/articles/nature12016.

(Continued)

*Primary Examiner* — Daniel Petkovsek
(74) *Attorney, Agent, or Firm* — Cozen O'Connor

(57) ABSTRACT

Entangled optical outputs are generated using one or more heralded entanglement sources, each comprising: first and second free-running entanglement sources, each providing a first (third) optical output comprising a quantum superposition of a pair of orthogonal optical modes, and a second (fourth) optical output comprising a quantum superposition of a pair of orthogonal optical modes; an optical module configured to perform an interferometric measurement based on optical interference between at least a portion of the first optical output and at least a portion of the third optical output, and to generate one or more detection signals based on the interferometric measurement in a series of time slots; and a trigger module configured to generate a trigger signal based on the one or more detection signals to indicate one or more time slots in which the second optical output and the fourth optical output are entangled with each other.

20 Claims, 14 Drawing Sheets

(56) References Cited

U.S. PATENT DOCUMENTS

| | | | |
|---|---|---|---|
| 9,800,399 B2 | 10/2017 | Tanzilli et al. | |
| 9,858,531 B1 * | 1/2018 | Monroe | G06N 10/40 |
| 11,475,347 B1 * | 10/2022 | Rudolph | G02B 6/12 |
| 2008/0050126 A1 | 2/2008 | Shapiro et al. | |
| 2010/0079833 A1 * | 4/2010 | Langford | H04L 9/0852 |
| | | | 359/107 |

OTHER PUBLICATIONS

Wagenknecht et al., "Experimental Demonstration of a Heralded Entanglement Source", Nature Photon 4,, pp. 1-24, Publication [online], Jul. 19, 2010, Site Visited [Nov. 11, 2022], Retrieved from Internet URL: https://www.nature.com/articles/nphoton.2010.123.

Merkouche et al., "Heralding multiple photonic pulsed Bell-pairs via frequency-resolved entanglement swapping", arXiv, pp. 1-18, Publication [online], Feb. 6, 2021, Site Visited [Nov. 11, 2022], Retrieved from Internet URL: https://arxiv.org/abs/2102.03485.

A. L. Migdalla et al., "Status of a Multiplexed Single Photon On-Demand Source" Proceedings of SPIE—The International Society for Optical Engineering, 9 pages, Aug. 2003, DOI: 10.1117/12.487898.

A. L. Migdall et al., "Tailoring single-photon and multiphoton probabilities of a single-photon on-demand source", American Physical Society, Phys. Rev. A, 4 pages, Nov. 2002, DOI: 10.1103/PhysRevA.66.053805.

D. Drahi et al., "Entangled resource for interfacing single- and dual-rail optical qubits", Quantum, pp. 1-9, Mar. 17, 2021, DOI: 10.22331/q-2021-03-23-416.

M. Pant et al., "Percolation thresholds for photonic quantum computing", Nat Commun 10, pp. 1-11, Mar. 2019, DOI: 10.1038/s41467-019-08948-x.

RB. Jin et al., "Highly efficient entanglement swapping and teleportation at telecom wavelength", Sci Rep 5, pp. 1-7, Mar. 2015, DOI: 10.1038/srep09333.

F. Kaneda et al., "Heralded single-photon source utilizing highly nondegenerate, spectrally factorable spontaneous parametric downconversion", Opt. Express 24, 15 pages, 2016, DOI: 10.1364/OE.24.010733.

F. Kaneda et al., "High-efficiency single-photon generation via large-scale active time multiplexing", Sci. Adv. 5, pp. 1-6, Oct. 2019, DOI: 10.1126/sciadv.aaw8586.

T. Hiemstra et al., "Pure Single Photons From Scalable Frequency Multiplexing", American Physical Society, Phys. Rev. Appl., 10 pages, 2020, DOI: 10.1103/PhysRevApplied.14.014052.

P. Kok et al., "Postselected versus nonpostselected quantum teleportation using parametric down-conversion", American Physical Society, Phys. Rev. A, 10 pages, Mar. 2000, DOI: 10.1103/PhysRevA.61.042304.

E. Knill et al., "A scheme for efficient quantum computation with linear optics", Nature, vol. 409, pp. 46-52, Jan. 4, 2001, DOI: 10.1038/35051009.

T. Kilmer et al., "Boosting linear-optical Bell measurement success probability with predetection squeezing and imperfect photon-number-resolving detectors", American Physical Society, Phys. Rev. A, 13 pages, Nov. 28, 2018, DOI: 10.1103/PhysRevA.99.032302.

F. Ewert et al., "3/4-efficient Bell measurement with passive linear optics and unentangled ancillae", American Physical Society, Physical Review Letters, 8 pages, Mar. 19, 2014, DOI: 10.1103/physrevlett.113.140403.

D. Su et al., "Conversion of Gaussian states to non-Gaussian states using photon-number-resolving detectors", American Physical Society (APS), Physical Review A, pp. 1-37, Apr. 19, 2019, DOI: 10.1103/physreva.100.052301.

M. K. Bhaskar et al., "Experimental demonstration of memory-enhanced quantum communication", Nature, pp. 1-15, Sep. 3, 2019, DOI: 10.1038/s41586-020-2103-5.

Paul G. Kwiat et al., "Ultrabright source of polarization-entangled photons", American Physical Society (APS), Physical Review A, pp. 1-4, May 22, 1999, DOI: 10.1103/physreva.60.r773.

M. Eaton et al., "Non-Gaussian and Gottesman-Kitaev-Preskill state preparation by photon catalysis", IOP Publishing, New J. Phys., pp. 1-19, 2019, DOI: 10.1088/1367-2630/ab5330.

E. Meyer-Scott et al., "Single-photon sources: Approaching the ideal through multiplexing", Rev. Sci. Instrum. 91, pp. 1-36, Apr. 1, 2020, DOI: 10.1063/5.0003320.

* cited by examiner

HERALDED PHOTONIC ENTANGLEMENT SOURCE

CROSS-REFERENCE TO RELATED APPLICATION(S)

This application claims priority to and the benefit of U.S. Provisional Application Ser. No. 63/203,725, entitled "PHOTONIC ENTANGLEMENT SOURCE BASED ON CASCADING PRIMARY ENTANGLEMENT SOURCES," filed on Jul. 29, 2021, the entire disclosure of which is incorporated herein by reference.

STATEMENT AS TO FEDERALLY SPONSORED RESEARCH

This invention was made with government support under Grant No. 1941583, awarded by NSF. The government has certain rights in the invention.

TECHNICAL FIELD

This disclosure relates to a heralded photonic entanglement source.

BACKGROUND

As progress is made towards realizing the capabilities of quantum networking (sometimes referred to as a quantum internet) that includes the generation and distribution of entanglement among multiple network nodes at high rates, some of the remaining enabling-technology challenges include: scalable sources of high-fidelity on-demand photonic entanglement, high-efficiency high-bandwidth high-coherence-time universal-quantum-logic-capable quantum memories, and high-efficiency converters between various qubit forms native to the various quantum-memory implementations and optical-frequency photonic qubits.

SUMMARY

In one aspect, in general, an apparatus for generating at least two entangled optical outputs comprises one or more heralded entanglement sources. Each heralded entanglement source comprises: a first free-running entanglement source providing a first optical output comprising a quantum superposition of first and second orthogonal optical modes, and a second optical output comprising a quantum superposition of third and fourth orthogonal optical modes, entangled with the first optical output; a second free-running entanglement source providing a third optical output comprising a quantum superposition of fifth and sixth orthogonal optical modes, and a fourth optical output comprising a quantum superposition of seventh and eighth orthogonal optical modes, entangled with the third optical output; one or more beam splitters configured to combine the first optical mode and the fifth optical mode and combine the second optical mode and the sixth optical mode; two or more optical detectors configured to detect a first output of the one or more beam splitters and generate a first detection signal in a series of time slots, detect a second output of the one or more beam splitters and generate a second detection signal in the series of time slots, detect a third output of the one or more beam splitters and generate a third detection signal in the series of time slots, and detect a fourth output of the one or more beam splitters and generate a fourth detection signal in the series of time slots; and a trigger module configured to generate a trigger signal based on the first, second, third, and fourth detection signals to indicate one or more time slots in which the second optical output and the fourth optical output, provided from respective output ports of that heralded entanglement source, are entangled with each other.

Aspects can include one or more of the following features.

Each of the first and second free-running entanglement source comprises: a nonlinear optical medium that is arranged to generate a first converted photon and a second converted photon from a first direction based on conversion from a first set of one or more pump photons, and is arranged to generate a third converted photon and a fourth converted photon from a second direction based on conversion from a second set of one or more pump photons; and cross-coupling optics configured to provide a pair of entangled optical outputs based on directing paths of the first and third converted photons to a first output port of that free-running entanglement source and directing paths of the second and fourth converted photons to a second output port of that free-running entanglement source.

Each of the first and second free-running entanglement sources is pumped by a common pump source.

The first and second free-running entanglement sources each have a nonlinear optical medium that is a different portion of a common nonlinear optical crystal.

If the first and second converted photons are generated, a sum of frequencies of the first converted photon and the second converted photon is equal to a sum of frequencies of the one or more pump photons of the first set; or if the third and fourth converted photon are generated, a sum of frequencies of the third converted photon and the fourth converted photon is equal to a sum of frequencies of the one or more pump photons of the second set.

The respective output ports of that heralded entanglement source have a physical separation of less than 1 meter.

The apparatus comprises a plurality of the heralded entanglement sources.

The apparatus further comprises: a first optical multiplexer configured to combine first output ports of each of the heralded entanglement sources into a first multiplexed output; a second optical multiplexer configured to combine second output ports of each of the heralded entanglement sources into a second multiplexed output; and a controller configured to control the first and second optical multiplexers based on respective trigger signals generated by the plurality of heralded entanglement sources.

The apparatus further comprises quantum memory modules at respective multiplexed outputs of each of the optical multiplexers.

The apparatus further comprises quantum memory modules at respective outputs of each of the heralded entanglement sources.

The first, second, third, and fourth optical detectors are each configured to generate a binary detection signal that distinguishes a detected photon number equal to one for a first binary state from a detected photon number not equal to one for a second binary state.

The orthogonal optical modes of the first optical output are one of: orthogonal polarization modes, orthogonal temporal modes, orthogonal spectral modes, or orthogonal spatial modes.

In another aspect, in general, a method for generating at least two entangled optical outputs from one or more heralded entanglement sources comprises: for each of the one or more heralded entanglement sources: providing from a first free-running entanglement source a first optical output comprising a quantum superposition of first and second orthogonal optical modes, and a second optical output comprising a quantum superposition of third and fourth orthogonal optical modes, entangled with the first optical output; providing from a second free-running entanglement source a third optical output comprising a quantum superposition of fifth and sixth orthogonal optical modes, and a fourth optical output comprising a quantum superposition of seventh and eighth orthogonal optical modes, entangled with the third optical output; combining, using one or more beam splitters, the first optical mode and the fifth optical mode, and the second optical mode and the sixth optical mode; detecting, using two or more optical detectors, a first output of the one or more beam splitters to generate a first detection signal in a series of time slots, a second output of the one or more beam splitters to generate a second detection signal in the series of time slots, a third output of the one or more beam splitters to generate a third detection signal in the series of time slots, and a fourth output of the one or more beam splitters to generate a fourth detection signal in the series of time slots; and generating, using a trigger module, a trigger signal based on the first, second, third, and fourth detection signals to indicate one or more time slots in which the second optical output and the fourth optical output, provided from respective output ports of that heralded entanglement source, are entangled with each other.

Aspects can include the following feature.

The one or more heralded entanglement sources comprise a plurality of heralded entanglement sources, and the method further comprises: combining, using a first optical multiplexer, first output ports of each of the heralded entanglement sources into a first multiplexed output; combining, using a second optical multiplexer, second output ports of each of the heralded entanglement sources into a second multiplexed output; and controlling the first and second optical multiplexers based on respective trigger signals generated by the plurality of heralded entanglement sources.

In another aspect, in general, an apparatus for generating at least two entangled optical outputs comprises one or more heralded entanglement sources. Each heralded entanglement source comprises: a first free-running entanglement source providing a first optical output comprising a quantum superposition of a pair of orthogonal optical modes, and a second optical output comprising a quantum superposition of a pair of orthogonal optical modes, entangled with the first optical output; a second free-running entanglement source providing a third optical output comprising a quantum superposition of a pair of orthogonal optical modes, and a fourth optical output comprising a quantum superposition of a pair of orthogonal optical modes, entangled with the third optical output; an optical module configured to perform an interferometric measurement based on optical interference between at least a portion of the first optical output and at least a portion of the third optical output, and to generate one or more detection signals based on the interferometric measurement in a series of time slots; and a trigger module configured to generate a trigger signal based on the one or more detection signals to indicate one or more time slots in which the second optical output and the fourth optical output, provided from respective output ports of that heralded entanglement source, are entangled with each other.

Aspects can include one or more of the following features.

The interferometric measurement comprises a Bell state measurement.

The interferometric measurement comprises a passive optical interference based on a combination of optical modes from the one or more heralded entanglement sources in a beam splitter.

The interferometric measurement comprises an active optical interference based on a boosted optical interaction that includes at least one of: (1) a quadrature squeezing operation, or (2) combination of optical modes from the one or more heralded entanglement sources with one or more single photons from at least one single photon source.

In another aspect, in general, an apparatus for generating at least two entangled optical outputs comprises a plurality of heralded entanglement sources. Each heralded entanglement source comprises: a first output port providing a first optical output comprising a quantum superposition of orthogonal optical modes, a second output port providing a second optical output comprising a quantum superposition of orthogonal optical modes, and a trigger module configured to generate a trigger signal to indicate one or more time slots in which the first optical output and the second optical output are entangled with each other; a first optical multiplexer configured to combine first output ports of each of the heralded entanglement sources into a first multiplexed output; a second optical multiplexer configured to combine second output ports of each of the heralded entanglement sources into a second multiplexed output; and a controller configured to control the first and second optical multiplexers based on respective trigger signals generated by the plurality of heralded entanglement sources.

Aspects can include the following feature.

Each heralded entanglement source comprises an optical module configured to perform an interferometric measurement based on optical interference between at least a portion of an optical output from a first free-running entanglement source and an optical output from a second free-running entanglement source, and to generate one or more detection signals based on the interferometric measurement in a series of time slots.

Aspects can have one or more of the following advantages.

Deterministic sources of high-fidelity entangled qubit pairs encoded in the dual-rail photonic basis, e.g., presence of a single photon in one of two orthogonal modes, can be used in a variety of applications of quantum information processing, including high-rate high-fidelity quantum communications over long distances. Some sources of such photonic entanglement, e.g., those that leverage spontaneous parametric down conversion (SPDC) or spontaneous four-wave mixing (sFWM), generate an entangled (so called, continuous-variable) quantum state that contains contributions from high-order photon terms that lie outside the span of the dual-rail basis, which may be detrimental to some applications. One could use low pump power to mitigate the effects of those high-order terms. However, that reduces the pair generation rate, and the source becomes inherently probabilistic. In some implementations described herein, a heralded entanglement source is able to perform a linear-optical entanglement swap between two free-running SPDC sources to generate a heralded photonic entangled state that has a higher fidelity (to the ideal Bell state) compared to a single free-running SPDC source. Further, with the Bell swap providing a heralding trigger, we also describe implementations of a heralded-multiplexed source, which despite reasonable switching losses and detector loss and noise, yields a Fidelity versus Success Probability trade-off of a high-efficiency source of high-fidelity dual-rail photonic entanglement.

The implementations of a heralded-multiplexed source we describe herein may find application in satellite-based entanglement distribution, quantum repeaters, resource-efficient generation of more complex multi-photon entangled states for fault-tolerant quantum computing, and quantum sensors, among others.

Other features and advantages will become apparent from the following description, and from the figures and claims.

BRIEF DESCRIPTION OF THE DRAWINGS

The disclosure is best understood from the following detailed description when read in conjunction with the accompanying drawing. It is emphasized that, according to common practice, the various features of the drawing are not to-scale. On the contrary, the dimensions of the various features are arbitrarily expanded or reduced for clarity.

DETAILED DESCRIPTION

Figure 1A:
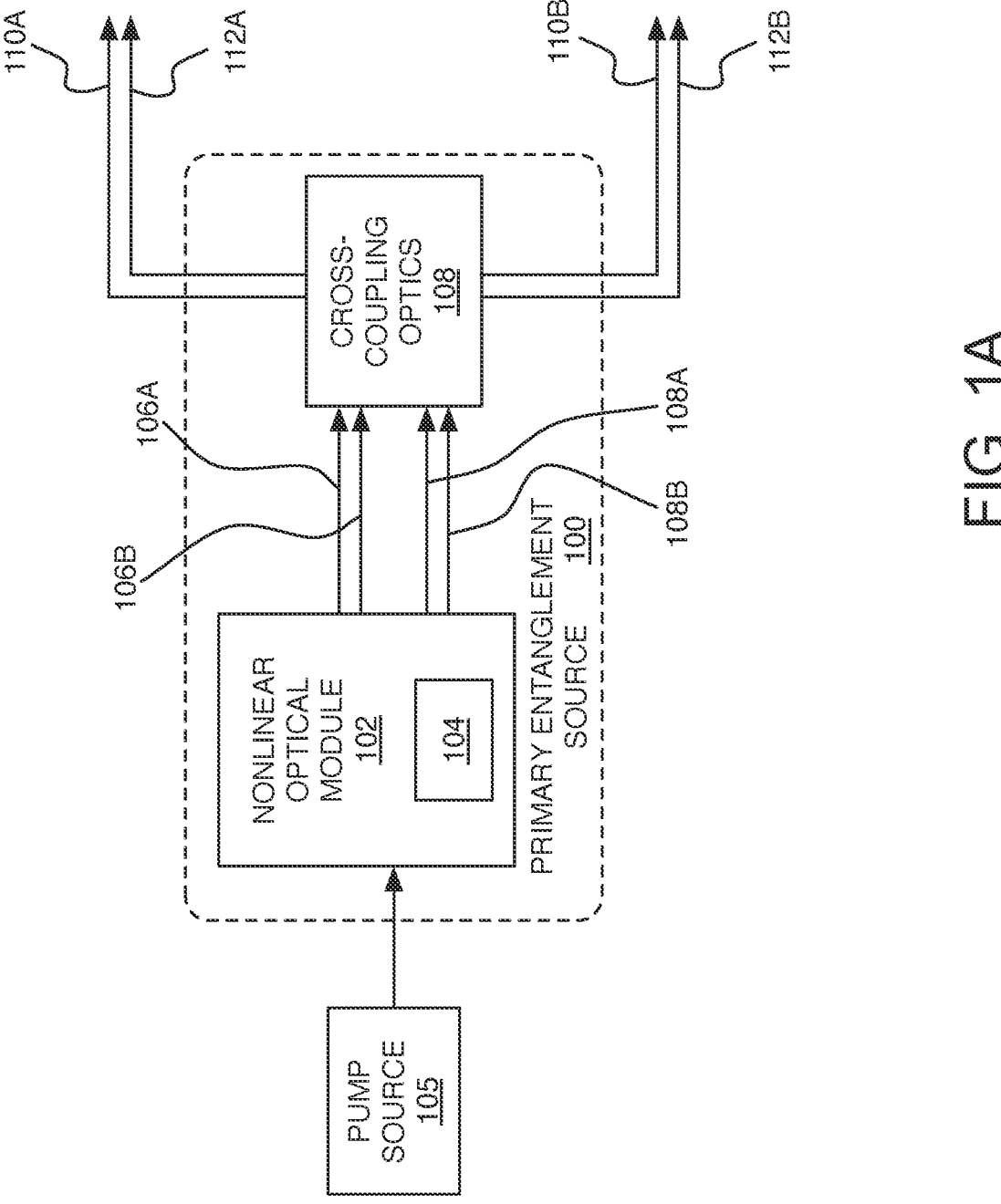
FIG. 1A is a schematic diagram of an example free-running entanglement source.

There are a variety of systems in which optical-frequency qubits encoded in photons can be used for long-distance transmission of quantum states. There are multiple ways to encode a qubit in a given photon. Two examples of such photonic qubit encodings are: (a) the Knill-Laflamme-Milburn (KLM) dual-rail photonic qubitencoding, where the presence of a single photon in one of two orthogonal (spatial, spectral, temporal or polarization) modes encodes the two logical quantum states of a qubit; and (b) the Gottesman-Kitaev-Preskill (GKP) encoding, which encodes the qubit in a single bosonic mode excited in one of two coherent superpositions of displaced quadrature-squeezed states that are shifted with respect to one another in the phase space. Dual-rail qubits can be produced and manipulated using passive linear optics, but they may also need a high-fidelity single-photon source and/or single-photon detectors. Quantum logic on dual-rail qubits using passive linear optics and single-photon detectors may be used in some systems. Despite the gates being inherently probabilistic in the original KLM scheme, advancements on single-photon ancilla-assisted boosted linear-optical quantum logic has ushered linear optical quantum computing using dual rail qubits into highly scalable architectures. Alternatively, GKP qubit is known to be the most loss-resilient photonic qubit encoding, and Clifford quantum logic is deterministically implementable using squeezers and linear optics. However, not only are GKP qubits hard to produce, there is no known way to store GKP qubits and GKP-basis entangled states in heralded quantum memories. Thus, many of the examples described herein will be configured for using the dual-rail qubit encoding. The multiplexed heralded entanglement generation techniques we describe herein, however, are applicable to other photonic qubit encodings and to other (e.g., multi-qubit) entangled states.

We describe various implementations of an on-demand photonic entanglement source that produces high-fidelity two-qubit entangled Bell states with the qubits encoded in the dual-rail photonic basis. There have been some calculations of quantum repeater protocols and quantum network routing algorithms that assume the availability of unit-Fidelity sources of dual-rail photonic entanglement. This results in these analyses predicting, despite inclusion of linear losses everywhere in the system, pristine dual-rail Bell states, i.e., entangled bits (ebits), be delivered to the communicating parties Alice and Bob. However, sources that deterministically generate dual-rail Bell states suitable for communications can be challenging to build. The photon frequencies from some types of individual emitters can vary slightly, and the emitted photon frequency may not be compatible with telecommunications hardware. Some sources of dual-rail entanglement used in practice rely on spontaneous parametric down conversion (SPDC), where single photons from a strong pump laser impinging on a carefully phase-matched (possibly periodically-poled) $\chi^{(2)}$ crystal splits into entangled photon pairs at two frequencies. Alternatively, one can employ the process of spontaneous four-wave mixing (FWM), in which a pair of pump photons give rise to an entangled pair. Herein we will describe systems that use SPDC-based sources in various implementations, but the example implementations can alternatively use other sources, including FWM-based sources.

There are many variants of SPDC-based entangled photon pair generation methods. However, a detailed physical analysis of these sources has shown that the complete quantum state generated, described by two copies of the so-called two-mode squeezed vacuum (TMSV), contains contributions from vacuum and high-order, e.g., two-photon-pair terms in addition to the desired dual-rail Bell state, which can adversely affect both the distribution rates and the Fidelity of the distributed entanglement. In fact, the pump power may need to be carefully optimized to maximize the entanglement rate, while adhering to a desired Fidelity threshold. One possible strategy is to turn down the pump power so low that the probability that the source produces two-pair (and higher-order) states becomes negligible. Of course, this entails increasing the contribution of vacuum to the emitted state and reduces the rate at which the desired Bell states are produced. The vacuum term often does not affect the usability of the source in an application, either because it gets filtered out by the "click" of a detector, e.g., in a quantum key distribution (QKD) experiment that provides a "post-selection trigger" to consider only those times slots that had a photon in it; or because a quantum memory provides a "heralding trigger" declaring that it successfully loaded a dual-rail photonic qubit into its native qubit domain (hence filtering out the vacuum).

Other than the reduced pair-production rate of the above strategy of turning down the pump power, another potential problem with such a "free-running" standalone SPDC-based entanglement source is that it is probabilistic, and does not have a heralding trigger. In other words, with such a free-running entanglement source, we cannot in principle know in which time slot the source actually produced an entangled photon pair, a potential detriment in some applications.

We describe implementations of an entanglement source that may be able to alleviate one or more of the above-listed problems, and in some implementations, yield a high-rate, high-fidelity, near-deterministic source of dual-rail entangled photonic qubit pairs. We first describe implementations of a heralded entanglement source, which employs two free-running entanglement sources, and performs a linear-optical Bell state measurement (BSM), sometimes referred to as an "entanglement swap", to yield an entangled state on the "outer" undetected mode pairs. This state has a much lower vacuum and high-order-photon contributions compared to a standalone free-running entanglement source. Thereafter, we leverage the heralding trigger from the BSM to multiplex M>1 such heralded entanglement sources, using two switch-arrays (each consisting of $\log_2$ M switches) and a controller that lets out entangled photon pairs from the "successful" source, in order to improve the pair-production rate. The switching losses, which scales up logarithmically in M, and photon-number-resolving (PNR) detector imperfections within the BSM, i.e., efficiency and dark counts, are incorporated into the description of the Fidelity versus entanglement generation rate of the overall heralded-multiplexed source.

FIG. 1A shows an example free-running entanglement source 100. Two such free-running entanglement sources can be designed to yield a heralded entanglement source. Such heralded entanglement sources can then be combined using multiplexers to yield a heralded-multiplexed entanglement source with various advantageous properties, such as the multiple heralded entanglement sources 1-M of the examples of the heralded-multiplexed entanglement sources shown in FIG. X and FIG. Y.

In this example, the free-running entanglement source 100 includes a nonlinear optical module 102 that includes a nonlinear optical medium 104 (e.g., a nonlinear optical crystal). A pump source 105 provides pump photons to the nonlinear optical module 102. The optical medium 104 is arranged to generate a first converted photon 106A and a second converted photon 106B from a first direction based on conversion (e.g., SPDC) from a first set of one or more pump photons, and is arranged to generate a third converted photon 108A and a fourth converted photon 108B from a second direction based on conversion from a second set of one or more pump photons. Cross-coupling optics 108 is configured to provide a pair of entangled optical outputs based on directing paths of the first and third converted photons to a first output port (with orthogonal modes 110A and 112A) and directing paths of the second and fourth converted photons to a second output port (with orthogonal modes 110B and 112B).

Figure 1B:
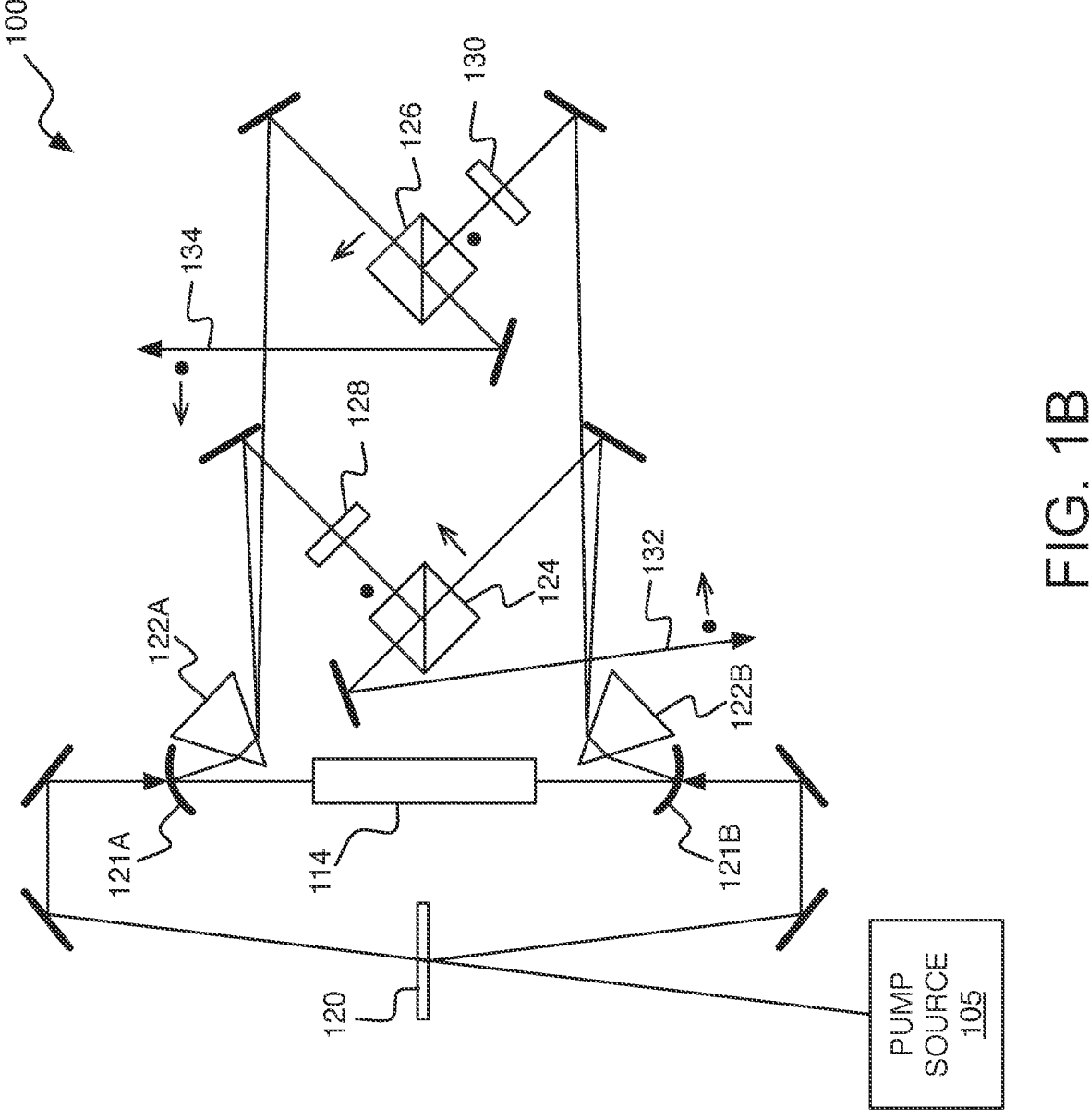
FIG. 1B is a schematic diagram of an example free-running entanglement source.

FIG. 1B shows an example implementation of the free-running entanglement source 100 that is formed using a nonlinear optical crystal 114 that is pumped by the pump source 105 to trigger spontaneous parametric downconversion (e.g., using a periodically poled crystal, such as periodically poled lithium niobate). The output optical beam from the pump source 105 is split by a 50/50 beam splitter 120 into pump beams with substantially equal power, which coherently pump the nonlinear optical crystal 114 in both the forward and backward directions. By overlapping the spatial modes of the forward and backward pump beams, the two downconversion interactions have substantially identical characteristics (e.g., phase matching conditions, and conversion efficiencies), and the two pump beams are coherent with each other. Curved mirrors 121A and 121B in are positioned to reflect and focus the downconverted pair of signal and idler photons in the forward and reverse directions, respectively. In this example, the wavelengths are selected so that the signal and idler photons have different wavelengths (e.g., a 795 nm signal wavelength, and a 1608 nm idler wavelength, from a 532 nm pump wavelength). The initially co-propagating signal and idler photons are separated into different propagation paths by a prism 122A and 122B on the forward and backward directions, respectively. The signal and idler photons also exit from the crystal 114 with the same (horizontal) polarization since type-I phase matching is used. Before the forward and backward path signal photons are combined in a polarizing beam splitter 124, and the forward and backward path idler photons are combined in a polarizing beam splitter 126, the polarization of one of the forward or backward paths is rotated so that the two polarization states are orthogonal when combined. In this example, the polarization state of the forward-path signal photon and of the backward-path idler photon are rotated to the orthogonal (vertical) polarization state. When pumped with a low enough pump power, a single entangled pair of signal and idler photons is likely to be emitted at a signal output 132 and an idler output 134. The joint quantum state of each entangled pair of signal and idler photons may also depend on certain characteristics of the arrangement of the source 100, such as the relative phase delays of the signal and idler optical paths at the location at which they paths are combined. In this example, the polarization state of the photon in each of the signal output 132 and the idler output 134 is random (i.e., 50% probability of being horizontal or vertical, depending on whether the corresponding pump photon entered from the forward or reverse direction), but due to the entanglement, given that the signal photon is in a particular polarization state then the idler photon will be in the orthogonal polarization state.

This arrangement of FIG. 1B is just one example of a scheme for creating polarization entanglement in a free-running entanglement source. A variety of other arrangements are also possible by combining the outputs from two coherently-pumped substantially identical downconverters whose outputs are combined using cross-coupling optics that are symmetric to yield substantially identical, and thus substantially indistinguishable, paths for combining the two downconverters. A variety of modifications can also be made to increase efficiency, or narrow the output linewidths, for example. In some implementations, an optical cavity can be used to create a narrowband output, which may be appropriate, for example, for subsequent coupling into a trapped-atom quantum memory. Use of such an optical cavity may introduce associated timing uncertainty of a few reciprocal cavity linewidths. Or, for some applications, single-pass downconversion with a bandwidth determined by the phase matching condition may be preferred. The pump source 105 can provide a pump beam that is pulsed (e.g., a series of regularly spaced pulses having a predetermined pulse peak intensity, and a predetermined pulse shape that provides a predetermined pulse width) or a pump beam that is continuous-wave (CW) (e.g., a substantially constant intensity). For a pulsed pump, the downconverted signal and idler beams would also have corresponding pulse characteristics. Some of the example implementations described herein use pulsed free-running entanglement sources.

Figure 1C:
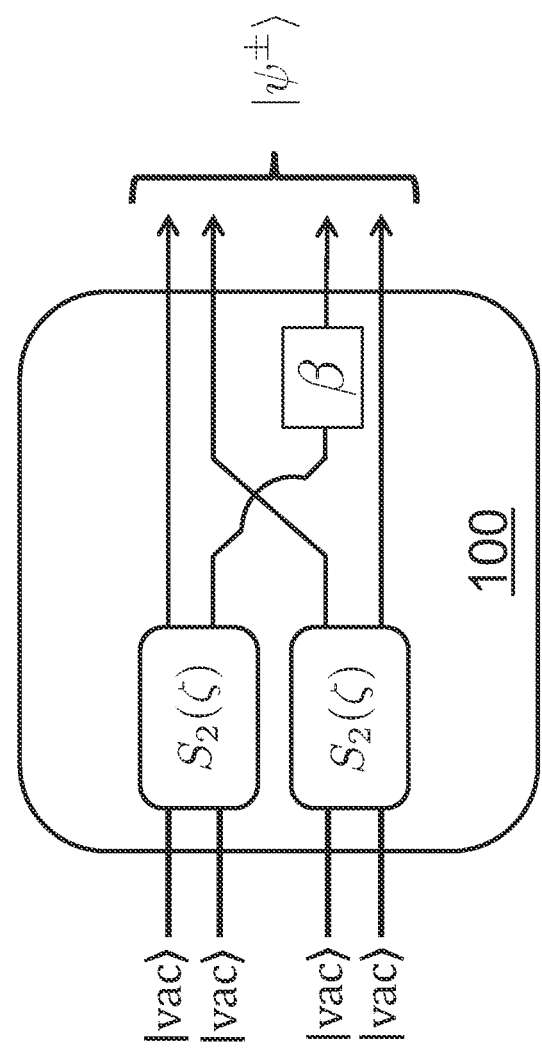
FIG. 1C is a schematic diagram of an example free-running entanglement source.

FIG. 1C shows an example representation of the free-running entanglement source 100 in terms of two-mode squeezing operations. The free-running entanglement source 100 takes four vacuum states for input and applies two two-mode squeezing unitary operations denoted by $S_2(\zeta)$. One rail from each two-mode squeezed source is swapped and a potential optical phase-shift $\beta(=0 \text{ or } \pi)$ is also introduced to one of the rails.

The physical model of the polarization-dual-rail SPDC-based pulsed entanglement source can be described as two copies of two-mode squeezed vacuum (TMSV) states with one mode of each TMSV swapped. The output is described by four modes: two orthogonal polarization modes of each of the (spatio-temporal) modes of a pair of pulses emitted by the source. Note that two orthogonal modes carry one dual-rail qubit. Hence, a two-qubit entangled Bell state can be encoded using four orthogonal modes. The quantum state of this 4-mode output is given by:

$$|\Psi^{\pm}\rangle = \sum_{n=0}^{\infty}\sum_{k=0}^{n}(\pm 1)^k \sqrt{\frac{p(n)}{n+1}}\, |n-k, k; k, n-k\rangle, \tag{1}$$

where, $$p(n) = (n+1)\frac{N_s^n}{(N_s+1)^{n+2}}, \tag{2}$$

with $N_s$ the mean photon number per mode. Note that, hence, the mean photon number per (dual-rail) qubit is $2N_s$. It should also be noted that this 4-mode state is a Gaussian state, i.e., its Wigner function is an 8-variate Gaussian function of the field quadratures of the concerned modes, because it is essentially a tensor product of two TMSV states with a pair of mode labels flipped.

We will use the following notation for two (of the four mutually orthogonal) dual-rail two-qubit Bell states:

$$|\Psi^{\pm}\rangle \equiv \frac{|1, 0; 0, 1\rangle \pm |0, 1; 1, 0\rangle}{\sqrt{2}}. \tag{3}$$

The ($\pm$) signs in Eqs. (1) and (3) refer to the possibility of an additional $\pi$ phase that could be applied to one of the polarization modes of one output pulse, e.g., using a half wave-plate, depending upon whether the desired Bell state for the application is $|\Psi^+\rangle$ or $|\Psi^-\rangle$.

In the $N_s \ll 1$ regime we can truncate the quantum state of the source up to the photon-number (Fock) support of 2 photon pairs:

$$|M^{\pm}\rangle = N_0\Big[\sqrt{p(0)}\,|0, 0; 0, 0\rangle + \sqrt{\frac{p(1)}{2}}\,(|1, 0; 0, 1\rangle \pm |0, 1; 1, 0\rangle) + \tag{4}$$
$$\sqrt{\frac{p(2)}{3}}\,(|2, 0; 0, 2\rangle \pm |1, 1; 1, 1\rangle + |0, 2; 2, 0\rangle)],$$

where we introduce $$N_0 = 1/\sqrt{p(0)+p(1)+p(2)} = (N_s+1)^2/\sqrt{6N_s^2+4N_s+1}$$

as a normalization factor that we choose for convenience to ensure that $|\Psi^{\pm}\rangle$, despite the Fock truncation, is a unit-norm quantum state.

The four-mode output state $|\Psi^{\pm}\rangle$ in (1) is a superposition of vacuum, one of the two dual-rail-basis Bell states $|M^{\pm}\rangle$, and additional states corresponding to n≥pairs of photons (in each of the two output pulses), with a geometrically distributed probability amplitude p(n). Without the aid of auxiliary highly non-linear operations such as a quantum memory or a non-destruction measurement, these higher-order n-photon-pair terms cannot be eliminated from the source output, as the very nature of the underlying TMSV model determines the proportion of these "spurious" terms. Reducing the mean photon number per mode $N_s$ by turning down the pump power reduces the proportion of two-pair terms $$p(2) = 3N_s^2/(N_s+1)^4,$$

at the expense of reducing p(1) as well, and hence increasing p(0). In the $N_s \ll 1$ regime, the vacuum term is the dominant component. A quantum non demolition (QND) measurement that performs a "vacuum or not" (VON) projection on the source output could aid in eliminating the vacuum component.

Figure 2A:
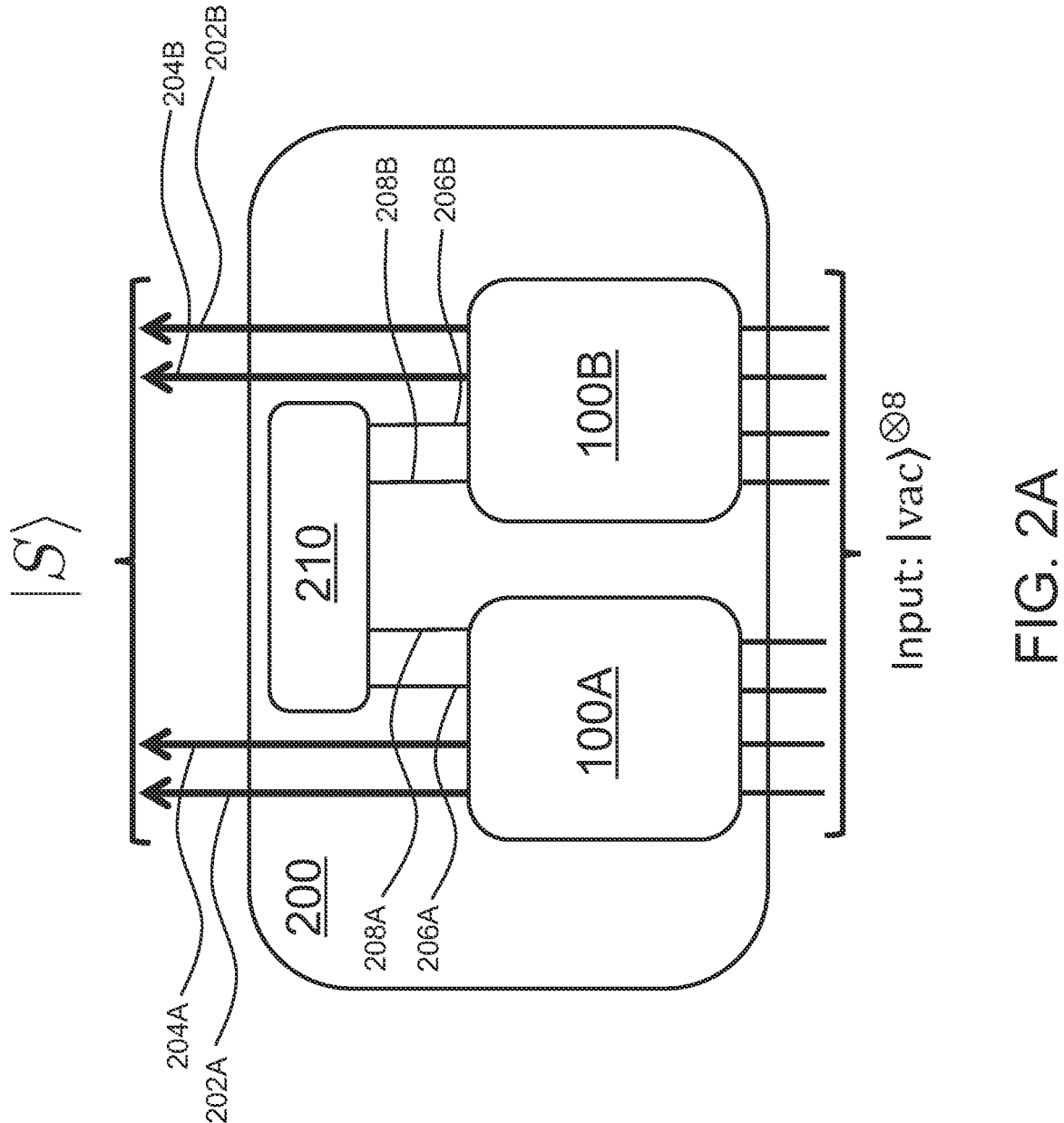
FIG. 2A is a schematic diagram of an example multiplexed entanglement source.

FIG. 2A shows a schematic diagram of an example heralded entanglement source 200. The heralded entanglement source 200 has a "heralding trigger," indicating in which time slot a copy of $|M\rangle$ was produced successfully. The heralded entanglement source 200 includes a first free-running entanglement source 100A and a second free-running entanglement source 100B. A first mode 202A, a second mode 204A, a third mode 206A, and a fourth mode 208A are output by the first free-running entanglement source 100A. A fifth mode 208B, a sixth mode 206B, a seventh mode 204B, and an eighth mode 202B are output by the second free-running entanglement source 204. The third mode 206A, the fourth mode 208A, the fifth mode 208B, and the sixth mode 206B are sent to a Bell state measurement arrangement 210. After the Bell state measurement 210, the first mode 202A, the second mode 204A, the seventh mode 204B, and the eight mode 202B collectively form an entangled state given in Eq. (5), conditioned on the results of the Bell state measurement corresponding to one of the two "desirable" click patterns.

Figure 2B:
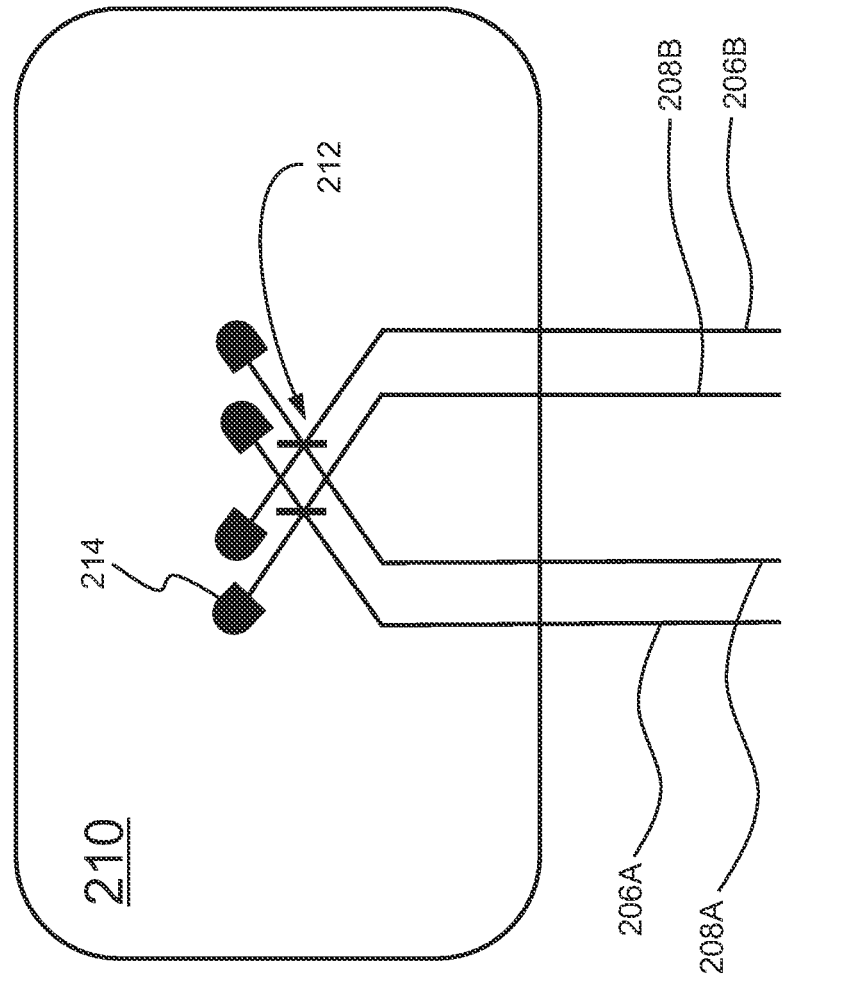
FIGS. 2B-2E are schematic diagrams of example Bell state measurement arrangements.

FIG. 2B shows an example Bell state measurement arrangement 210. The third mode 206A and the fifth mode 208B traverse a beam splitter 212. The fourth mode 208A and the sixth mode 206B traverse a beam splitter 212. Respective photon number resolving detectors 214 measure the outputs of each beam splitter 212. In this example, the Bell state measurement arrangement 210 is configured to use a passive optical interference based on a combination of optical modes in the beam splitters. For example, the third mode 206A and the fifth mode 208B are combined after reflection and transmission, respectively, at one of the beam splitters 212 with the resulting optical wave formed from optical interference impinging upon one of the photon number resolving detectors 214. In this example, each beam splitter 212 is a 50/50 beam slitter where its transmissivity and reflectivity are substantially equal to each other, at around 50% when the loss is negligible, and the probability of a photon being transmitted or reflected when arriving at the beam splitter is around 50%. As used herein, the term "beam splitter" (also called a "beamsplitter") refers to any linear optical element that partially transmits and partially reflects an incoming optical beam, which can be used to split an incoming optical beam into transmitted and reflected portions, and/or to combine portions of two or more incoming optical beams into an output optical beam that combines the portions using optical interference (i.e., constructive and/or destructive interference).

Because the orthogonal modes being used in the superposition state of an output of each free-running entanglement source can be spatially separated, either due to pre-existing spatial separation for spatial encoding, or by an appropriate form of demultiplexing for each of the three other types of encoding (temporal, polarization, or spectral), any of the four types of encoding can be used in the arrangement 210 of FIG. 2B in which the orthogonal modes are separated in space. Alternatively, other Bell state measurement arrangements can be used for each of the non-spatial encodings (temporal, polarization, or spectral) where the orthogonal modes used in the superposition state are spatially overlapping, as shown in FIG. 2C, FIG. 2D, and FIG. 2E.

Figure 2C:
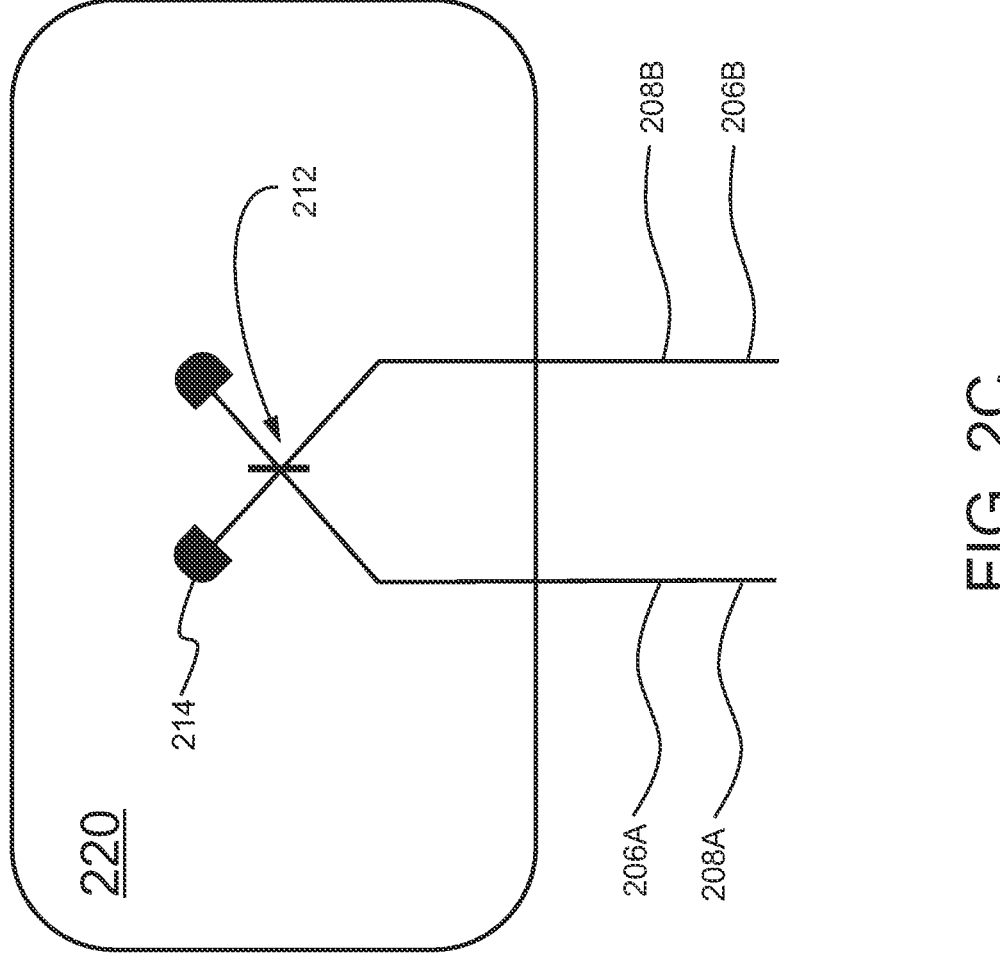

FIG. 2C shows an example Bell state measurement arrangement 220 for a temporal encoding in which the orthogonal temporal modes 206A and 208A are spatially overlapped at the input and the orthogonal temporal modes 206B and 208B are spatially overlapped at the input. Due to the separation in time of the detection events that occur due to the different temporal modes, only a single beam splitter 212 is needed in this arrangement 220. The two PNR detectors 214 at the outputs of the beam splitter 212 are able to distinguish equivalent click patterns to those of the four PNR detectors 214 of the arrangement 210, using two time slots for each of the two PNR detectors 214.

Figure 2D:
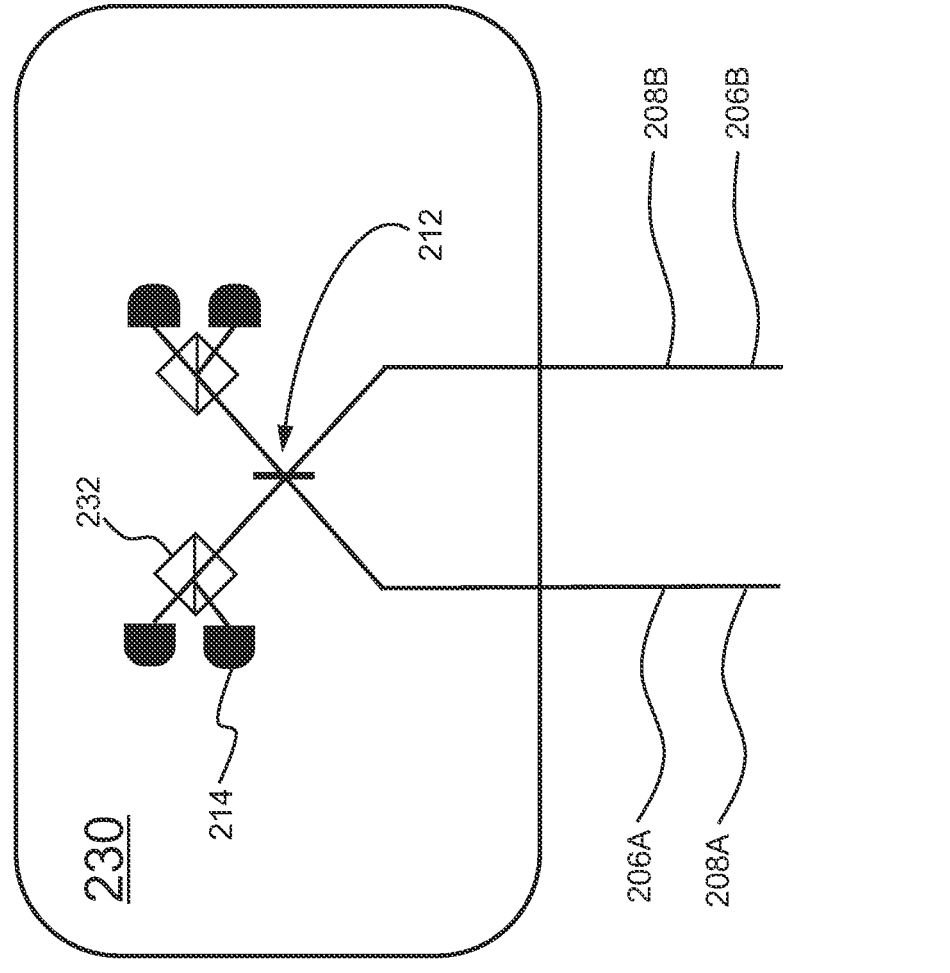

FIG. 2D shows an example Bell state measurement arrangement 230 for a polarization encoding in which the orthogonal polarization modes 206A and 208A are spatially overlapped at the input and the orthogonal polarization modes 206B and 208B are spatially overlapped at the input. This example is also able to use only a single beam splitter 212 (instead of two beam splitters) since there can be two separate linear optical interference operations being performed at the same time along each of two orthogonal polarization axes (e.g., vertical and horizontal), and results of these linear interference operations can then be separated by polarizing beam splitters 232 before the four PNR detectors 214 in this example. The four PNR detectors 214 in this example are able to distinguish equivalent click patters to those of the four PNR detectors 214 of the arrangement 210.

Figure 2E:
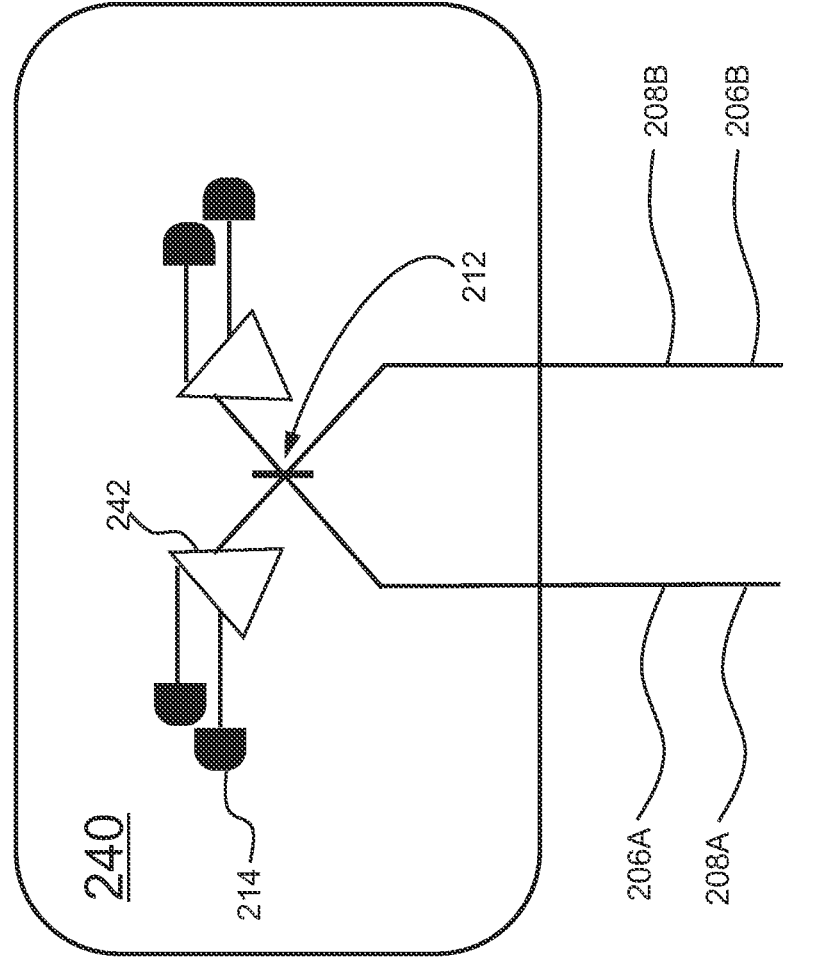

FIG. 2E shows an example Bell state measurement arrangement 240 for a spectral encoding in which the orthogonal spectral modes 206A and 208A are spatially overlapped at the input and the orthogonal spectral modes 206B and 208B are spatially overlapped at the input. This example is also able to use only a single beam splitter 212 (instead of two beam splitters) since there can be two separate linear optical interference operations being performed at the same time in each of two orthogonal spectral bands (e.g., a longer wavelength band and a shorter wavelength band), and results of these linear interference operations can then be separated by spectral demultiplexers 242 before the four PNR detectors 214 in this example. For example, the spectral demultiplexers are able to separate light of different wavelengths (or equivalently frequencies) using prisms as depicted in this example, or gratings or any other optical element that has frequency selectivity (e.g., dispersion or other frequency-dependent behavior). The four PNR detectors 214 in this example are able to distinguish equivalent click patters to those of the four PNR detectors 214 of the arrangement 210.

Any of a variety of other arrangements for performing Bell state measurements can be used, including different arrangements of beam splitters and/or different types of detectors, where the result of a Bell state measurement is an ability to distinguish among different possible Bell states at the input, in some cases corresponding to detection events on a subset of photodetectors, such as PNR detectors used in these examples.

Alternatives to passive optical interactions, such as the passive optical interference described above, include "boosted" optical interactions, which can be used in some alternative implementations of Bell state measurement arrangements. For example, a boosted Bell state measurement arrangement can be used to enhance the best-case probability of success to greater than 50%. This boosting may be achieved, for example, by in-line squeezing in addition to the beam splitters, and/or by providing ancillary single photons at input ports of the beam splitters. An in-line squeezing form of boosting can be implemented using quadrature squeezing operation achieved, for example, using an optical parametric amplifier constructed from a nonlinear optical material. An ancillary photon form of boosting can be implemented using additional beam splitters that are positioned to combine ancillae single photons with the photons in the optical modes from the free-running entanglement sources 100A and 100B. The ancillae single photons can be provided by one or more single photon sources that are included as part of the heralded entanglement source 200.

Without intending to be bound by theory, we can temporarily assume that all the components are ideal, i.e., no coupling losses from the SPDC sources into the BSM, and ideal PNR detectors. These assumptions will be relaxed in later analysis. If the states fed into the BSM were ideal Bell states, i.e., with no multi-pair contributions, the resulting state of the unmeasured four outer modes would be ideal Bell states as well. However, since the outputs (4) of the free-running entanglement sources $|\Psi^+\rangle$ are not ideal Bell states $|\Psi^+\rangle$, despite observing a BSM "success", we might generate spurious states on those outer modes that are not Bell states.

If both the free-running sources produce the state $|\Psi^+\rangle$, the heralded output state of the undetected outer modes, upon the occurrence of a "desirable" click pattern, is given by:

$$|M\rangle = N_0' \left[ \frac{p(1)}{2}(|1, 0; 0, 1\rangle + (-1)^{m_1}|0, 1; 1, 0\rangle) + \right.$$
$$\left. (-1)^{m_2}\sqrt{\frac{p(0)p(2)}{3}}(|0, 0; 1, 1\rangle + (-1)^{m_1}|1, 1; 0, 0\rangle)\right], \tag{5}$$

where p(0), p(1), p(2) are as defined in (2), and the normalization constant $N_0'$ is given by:

$$N_0' = \left(\frac{p(1)^2}{2} + \frac{2p(0)p(2)}{3}\right)^{-1/2}. \tag{6}$$

By "desirable", we here signify the four click patterns (out of a possible eight) that are necessary but not sufficient to herald an entanglement swap between two dual-rail photonic modes on a linear optical BSM circuit. The reason the patterns are not sufficient is that these same patterns can also be produced by the undesirable event that both photons detected in the BSM came from only one of the SPDC sources, instead of one from each; unfortunately, the likelihood of these two processes are equal for SPDC. Therefore, to exclude the undesirable photon pair contribution from the same source, we rely on post-selection of a photon in each outer mode, either via direct detection or via a heralded quantum memory as discussed below.

Depending upon which of the four "desirable" click patterns occur on the four PNR detectors (e.g., 0011 implies: no-click, no-click, 1-click, 1-click), the values of $m_1$ and $m_2$ in the heralded state in Eq. (5) are given by:

| Click Pattern | $m_1$ | $m_2$ |
|---|---|---|
| 0011 | 0 | 0 |
| 1100 | 0 | 1 |
| 1001 | 1 | 1 |
| 0110 | 1 | 0 |

If both the free-running sources produce the state $|\Psi^-\rangle$, the heralded output state of the undetected outer modes is same as given in Eq. (5), except that the values of $m_2$ in the above table are flipped.

Henceforth, we will drop the $\pm$ superscript in the state $|M^+\rangle$, since for clarity we will be working with the state $|M^+\rangle$. Further, we will say the source was "successful" in producing an entangled state when one of the first two desirable click patterns above (0011 or 1100) occur (i.e., $m_1=0$). The reason for this is that we want the output state to be (close to) the $|M^+\rangle$ state. We will use $|M\rangle$ to denote the desirable output state of the heralded entanglement source, and not carry the $m_2$ index. This is because our results in this paper do not depend upon the value of $m_2$. Further, if the memories in which the distributed entanglement eventually gets stored have good quality native quantum logic, it is possible to apply a local single-qubit unitary operation to turn the Bell state $|\Psi^-\rangle$ into $|\Psi^+\rangle$, and vice versa. So, if one wishes to be inclusive of the output state produced to be (close to) the $|\Psi^-\rangle$ state as well, our expression for the probability of success, in Eq. (10) for instance, can be multiplied by 2.

The heralded entanglement source has a "heralding trigger", telling us in which time slot a copy of $|M\rangle$ was produced successfully, a feature that was missing in the free-running SPDC-based entanglement source.

Quantum memories (QMs) are a useful component of entanglement distribution protocols; especially so for building quantum repeaters for long-distance entanglement distribution, and in distilling high-Fidelity entanglement from low-Fidelity entangled qubit pairs. Memories that can efficiently load one qubit of a photonic entangled state, are necessary to store the quantum state for a time duration appropriate for the end application, or when it is ready to be interfaced to a larger quantum processor system, e.g., for performing teleported gates for distributed quantum computing.

There are at least two important characteristics of QMs pertinent to our analysis: the QM can selectively load one dual-rail qubit (i.e., two orthogonal optical modes), and it has a heralding trigger. In other words, when the memory is successful in loading the qubit, it raises a (classical) binary-valued flag declaring "success" or "failure".

Without intending to be bound by theory, we consider the following model for such a memory: one that performs a vacuum-or-not (VON) measurement, in a quantum non-demolition (QND) way. The QND measurement performed by this QM on the two incident modes can be expressed by the following positive-operator-valued measure (POVM) operators:

$$\hat{\Pi}_0 = |0, 0\rangle\langle0, 0|; \quad \hat{\Pi}_1 = \hat{I}_2 - |0, 0\rangle\langle0, 0|, \tag{7}$$

where $\hat{I}_2=\Sigma_{m,n}|n, m\rangle\langle n, m|$ is the identity operator of the two-mode bosonic Hilbert space. If a two-mode optical quantum state $|\psi\rangle =\Sigma_{m,n}c_{m,n}|m, n\rangle$ is incident on this QM, with probability $p_{vac}=|c_{0,0}|^2$, the memory would raise a "failure" flag, and the post-measurement state will be vacuum $|\psi_{vac}\rangle =0, 0\rangle$, i.e., nothing would be loaded into the quantum memory. However, with probability $p_{not-vac}=1-p_{vac}$, the memory would raise the "success" flag, and the post-measurement state would be $|\psi_{not-vac}\rangle =N(|\psi\rangle -c_{0,0}|0, 0\rangle$ ), where $N=1/\sqrt{1-|c_{0,0}|^2}$ is a normalization constant.

The example we describe of a QM that has a heralding trigger is useful in a variety of quantum communication protocols. Practically, one way to achieve this is by using memories that entangle the incoming photonic state with the quantum state of the memory's internal qubit. The heralding trigger may consist of measuring the reflected photonic quantum state in the optical domain. The measurement outcome projects the quantum state of the qubit held by the QM into a local-unitary-equivalent of the photonic quantum state.

We now present a detailed analysis of the heralded entanglement source that includes coupling losses and detector non-idealities in the PNR-based BSM. We will compare the performance of the heralded entanglement source with that of the free-running (SPDC-based entanglement) source.

We can compare the Fidelity of the generated states with the target Bell state $|\Psi^+\rangle$. For the free-running entanglement source, this is given by:

$$F(|\psi^+\rangle, |\Psi^+\rangle) = |\langle\psi^+|\Psi^+\rangle|^2 = \left|N_0\sqrt{p(1)}\right|^2. \tag{8}$$

Similarly, the Fidelity of $|M\rangle$ with $|\Psi^+\rangle$ is given by:

$$F(|M\rangle, |\Psi^+\rangle) = |\langle M|\Psi^+\rangle|^2 = \left|N_0' \cdot \frac{p(1)}{\sqrt{2}}\right|^2 = \frac{1}{2}, \tag{9}$$

where the factor of ½ arises from the unwanted cases where both detected photons came from the same source.

Next, we consider the Fidelities with $|\Psi^+\rangle$ but when both mode pairs of the respective entangled states $|\Psi\rangle$ (free-running entanglement source) or $|M\rangle$ (heralded entanglement source) are loaded into a pair of idealized heralded quantum memories. By inspection of Eq. (5) we find that, after successful loading onto the quantum memory, the heralded entanglement source with ideal elements will yield a unit-Fidelity Bell state loaded onto the two QMs.

Figure 3:
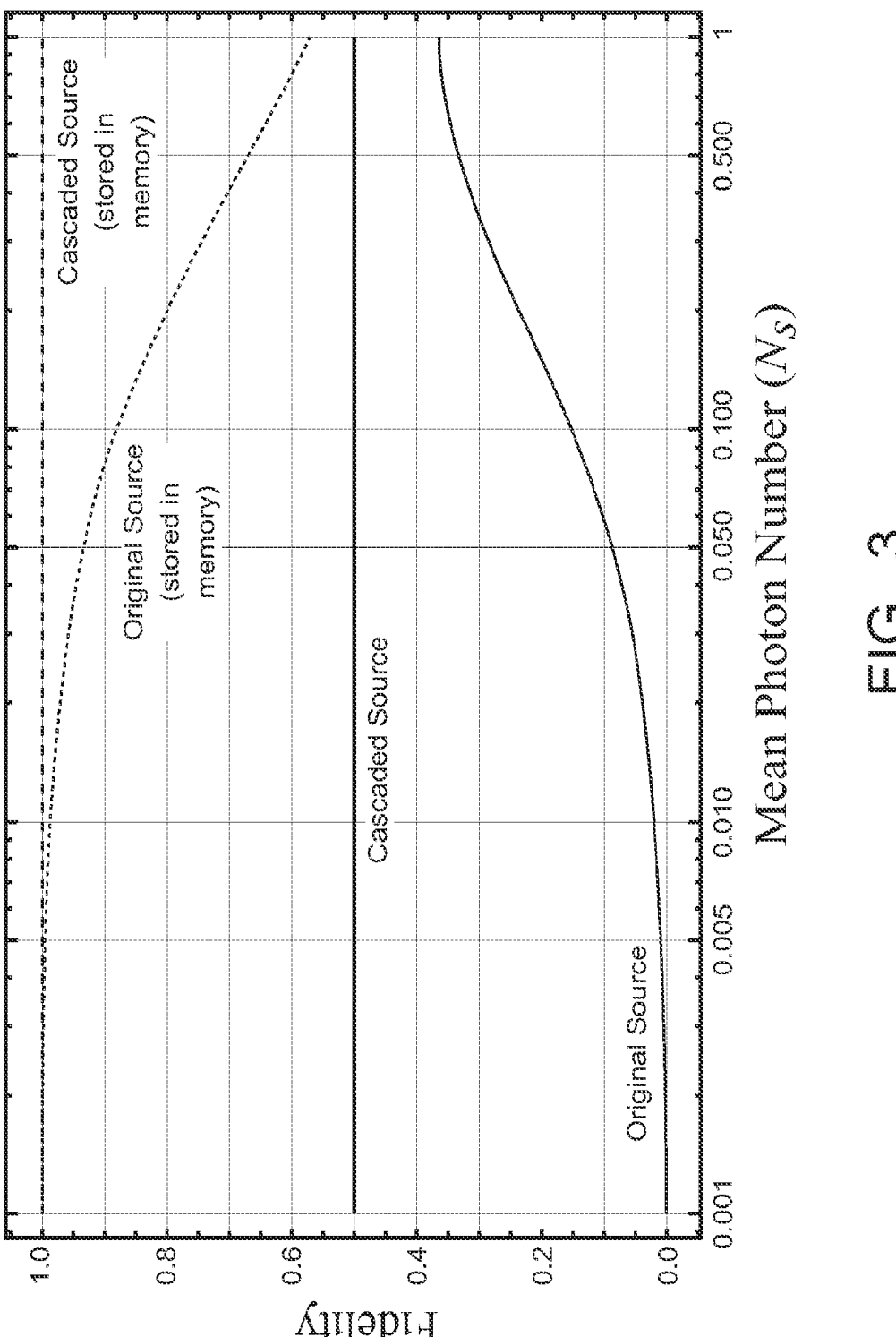
FIG. 3 is a plot of the respective fidelities of entangled states generated from the free-running SPDC source and the heralded entanglement source, before and after loading each mode pair into a quantum memory.

FIG. 3 is a plot showing all four of these fidelities with $|\Psi^+\rangle$ (the free-running and the heralded entanglement source, with and without a QM), plotted as a function of $N_s$. We see that the heralded entanglement source, assuming ideal elements for the BSM, has a superior Fidelity compared with the free-running entanglement source. Note that the preceding analysis assumes that the state generated by each free-running entanglement source is the pure state given by Eq. (4). SPDC sources can have an additional degree of freedom with respect to the temporal location of the emitted photons. This effect may be referred to as a "timing walk-off", which affects the quantum description of the emitted SPDC state, which in turn sets an upper bound on the fidelity (or equivalently, manifests as a minimum infidelity) of the emitted state from the heralded entanglement source, in comparison to the target state, $|\Psi^+\rangle$.

Since the heralded entanglement source is a heralded-state generation scheme, there is a generation probability, $P_{gen}$, which corresponds to the probability of the desirable click pattern and which is a function of $N_s$. Assuming ideal PNR detectors for the BSM and no other losses, this quantity is given by:

$$P_{gen} = \frac{1}{2} \times \left( \frac{p(1)^2}{4} + \frac{p(0)p(2)}{3} \right) = \frac{N_s^2}{(N_s + 1)^6}. \quad (10)$$

Note that the first term in Eq. (10) describes the desired case where each source contributed one photon to the BSM, while the second term describes the undesirable case where one source produced two pairs and the other produced none.

We will now include the effects of device non-idealities into the analysis of the entangled state produced by the heralded entanglement source. The specific non-idealities will consider in this section are 1) Detector efficiency and dark clicks and 2) coupling efficiency. In our present analysis, we will abstract off the non-ideality of a PNR detector into two parameters: a sub-unity detector efficiency ($\eta_d \leq 1$) and a non-zero dark click probability ($P_d \geq 0$) per detection gate (which will be assumed to be the length of a pulse slot for our calculations).

Figure 4:
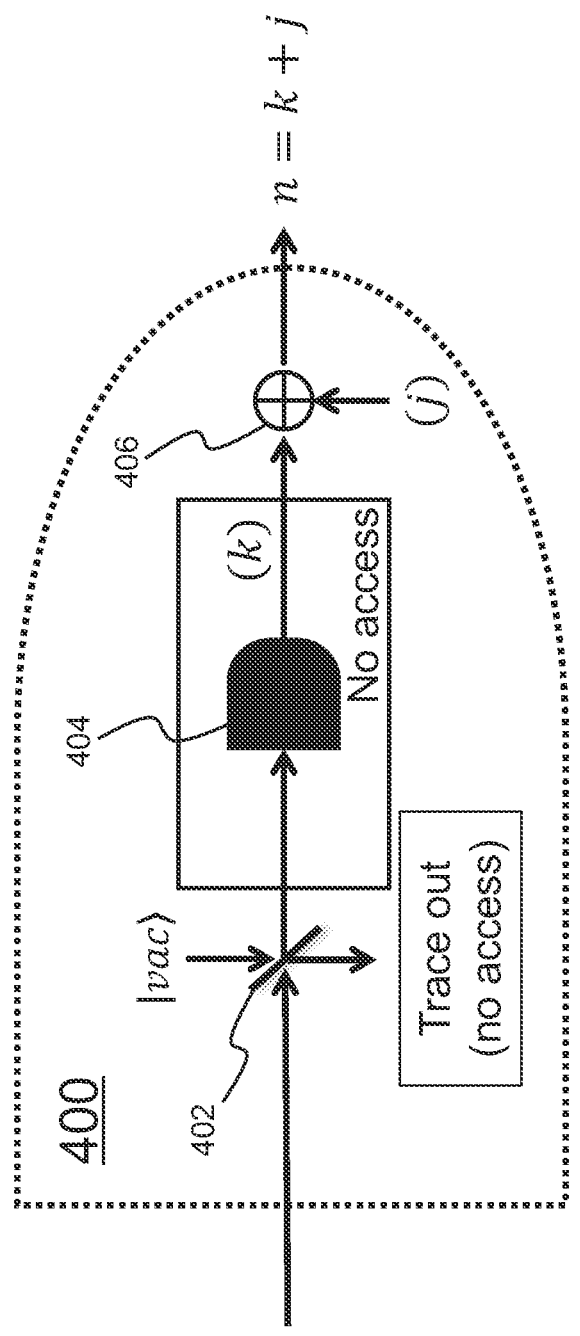
FIG. 4 is a schematic diagram of a photodetector with non-idealities.

FIG. 4 shows a schematic diagram of a photodetector 400 with some non-idealities marked. This includes the non-ideal detector efficiency (0d) represented by a beam splitter 402 and dark click probability $P_d$ for the Bernoulli random variable j. Since the non-unity efficiency of the photodetector 400 is captured by the beam splitter 402, an ideal photodetector 404 can then be used in the model of the photodetector 400. The output of the ideal photodetector is k "clicks", which is summed by the summer 406 with j "clicks" resulting from the dark counts. The photodetector 400 thus outputs n=k+j clicks. We will also account for losses in coupling the "inner" output modes of the SPDC sources (ones that go into the BSM) into a single-mode fiber. We will label the effective efficiency of this coupling, per mode, as $\eta_c$. Our analysis of the derived formulae shows that we can combine the two efficiency parameters into one efficiency parameter, i.e., $\eta \equiv \eta_c \eta_d$, i.e., the output state will be identical for any given value of $\eta$, regardless of the actual values of $\eta_c$ and $\eta_d$, as long as their product equals $\eta$.

When $P_d > 0$, the output of the heralded entanglement source is a mixed state—a statistical mixture of pure states corresponding to various "true" click patterns in the detectors (several of which may not be one of the 'desirable' patterns) which, with some probability, could result in the BSM using noisy detectors to conclude as a desirable pattern, and declare a success. The mixed state contains the ideal-device pure state as in Eq. (5) along with other pure states that are generated when the apparent-desirable click pattern actually includes one or more dark counts.

In general, the effect of detector efficiency $\eta_d < 1$ is equivalent to the detected modes being transmitted through a pure-loss bosonic channel of transmissivity $\eta_d$ prior to being incident on a unity-efficiency detector. Therefore, the pre-detection state is a mixed state, and the final density matrix for the present analysis is not compactly expressible.

Figure 5:
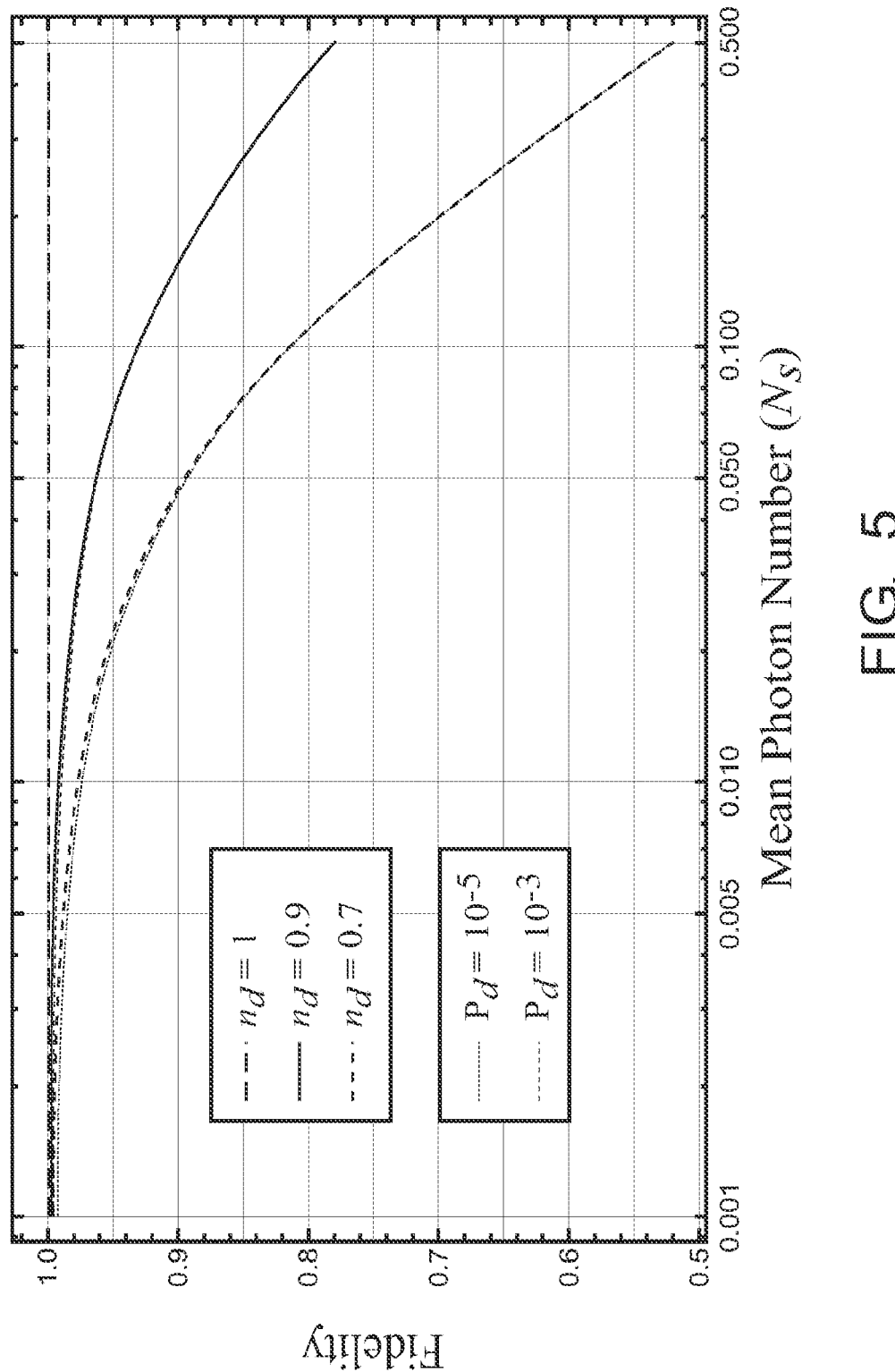
FIG. 5 is a plot of the fidelity of the entanglement states, from the heralded entanglement source and including non-idealities, after successfully loading both qubits into quantum memories.

FIG. 5 shows a plot the fidelity of the entangled state with the $|\Psi^+\rangle$ Bell state, after successfully loading both qubits into a pair of idealized heralded quantum memories. Recall that after successfully loading the entangled qubit pairs into idealized QMs, the Fidelity of the entangled state with the $|\Psi^+\rangle$ Bell state, with an ideal BSM, is 1 for the heralded entanglement source, regardless of the value of $N_s$. The plots in FIG. 5 show that the low-$N_s$ reduction of the fidelity of the photonic entangled state produced by the heralded entanglement source due to non-zero $P_d$ is almost completely suppressed by the quantum memories. Here we have limited the discussion to the heralded entanglement source, but the same arguments apply to the free-running entanglement source: The QND detection of the 'outer' mode photons, implied by the ideal heralding quantum memories lifts the state fidelity at low $N_s$ to 1, even in the presence of moderate BSM detector dark counts. We are thus able to construct a near-deterministic near-unity-Fidelity source of entanglement. Some implementations do so by multiplexing several heralded entanglement sources.

By using the heralding trigger in the heralded entanglement source, we can create heralded-multiplexed entanglement sources using an array of photonic switches, which releases an entangled state based on which source was successful in a given time slot.

Figure 6:
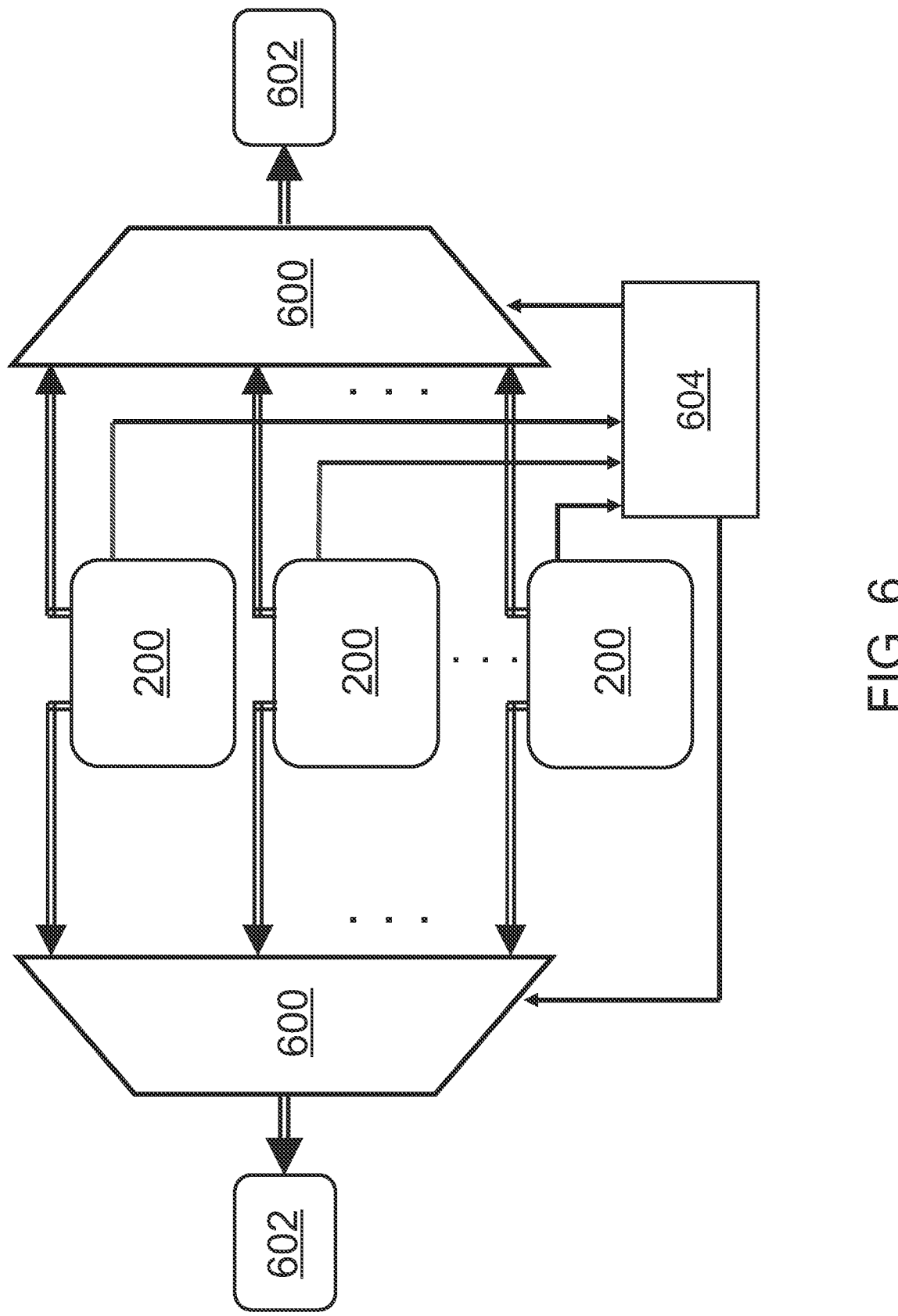
FIG. 6 is a schematic diagram of a multiplexing scheme for a source of dual-rail Bell states.

FIG. 6 shows an example of a heralded-multiplexed entanglement source. Using a bank of heralded entanglement sources 200 (M>1), both output mode pairs of each of the M sources are fed into M-to-1 optical switching arrays 600 (each built out of $\log_2$ M switches). The optical switching arrays 600 are controlled by a control module 604, which takes the heralding trigger of each heralded entanglement source 200 as inputs. The optical switching arrays 600 output the state of one of the successful heralded entanglement source in any time slot, assuming one or more succeeds in that time slot. The output photonic entangled state is then loaded into a pair of heralded quantum memories 602, which each perform a vacuum or not projective measurement on the output entangled state. If none succeed, the heralded-multiplexed source produces nothing, but the user of the source can know when such a "failure" event happens.

If there were no additional losses in switching, we could generate the entangled state in Eq. (5) with as high a success probability as we please, by increasing M indefinitely. The probability that an ideal multiplexed heralded entanglement source generates an entangled pair, $P_{success} = 1 - (1 - P_{gen})^M$. To make the source near on-demand, we would pick $M \approx 1/P_{gen}$, which would ensure that on average at least one of the heralded entanglement sources in the bank would have their internal BSM declare a success. But, this seemingly indefinite increase of $P_{success}$ toward 1 by increasing M does not work when device non-idealities, especially the switching losses, are accounted for.

We consider a multiplexing scheme comprising multiple heralded entanglement sources 200 that make parallel attempts to generate a target photonic state. This output photonic entangled state is then loaded into a pair of heralded quantum memories 602. M (number of heralded entanglement sources) and $N_s$ (determined by pump power) The device metrics in our model are quantified by: (1) coupling efficiency from the outputs of the heralded entanglement source ($\eta_c$), (2) efficiencies of all the PNR detectors within the BSM, ($\eta_d$), (3) dark click probability (per qubit slot) of all the detectors in the BSM, $P_d$, and (4)

switching losses per switch in the switch array, expressed as an effective transmissivity, ($\eta_s$) (hence the overall effective transmissivity being $$\eta_s^{log_2 M}).$$

The performance of the heralded-multiplexed entanglement source is quantified by the probability of success $P_{success}$, of the heralded-multiplexed source producing an entangled pair of dual rail qubits, and the Fidelity of that state produced with respect to the $|\Psi^+\rangle$ Bell state.

We find that there is a trade-off for fixed values of M (while $N_s$ is varied): for a given set of device metrics, there is an optimal value of M beyond which $P_{success}$ cannot be increased any further.

We note an interesting reversal in behavior when the switching loss per switch (quantified by $\eta_s$) increases beyond a threshold value of 1.5 dB (which corresponds to $\eta_s=1/\sqrt{2}\approx0.707$). When the loss per switch is below this threshold, the envelope is seen to attain its maximal value for an optimum choice of M. However, when the loss per switch is high, the trend reverses and increasing M is detrimental to the performance of the scheme.

The reason for the aforesaid reversal in the trend is as follows. The size of the switching array scales as $log_2$(M). Assuming switching efficiency per switch of $\eta_s$ (i.e., $log_{10}$ ($1/\eta_s$) dB of switching loss per switch), the output modes from a successful heralded entanglement source undergo an additional loss corresponding to an effective transmission of $$\eta_s^{log_2(M)}.$$

Now, unlike the case of the lossless switches, even though increasing the number of heralded entanglement sources M still increases the probability of success as $1-(1-P_{gen})^M$, it also decreases the probability that a successful output from one of the heralded entanglement sources would be successfully loaded into the memory (because $$\eta_s^{log_2(M)}$$

decreases as M increases). Given M and $N_s$, the probability of success for a heralded-multiplexed source to successfully generate an entangled state is given by:

$$P_{success} = \left(1 - (1 - P_{gen})^M\right) \times (1 - p_{|00\rangle})^2, \qquad (11)$$

where $P_{gen}$ is the success probability of an individual heralded entanglement source, and $p_{|00\rangle}$ is the probability the idealized quantum memory (IQM) on one side of the heralded-multiplexed source shown in FIG. 6 "fails" to load the photonic qubit into the memory. This $p_{|00\rangle}$ term increases as M increases due to compounding switching losses. The M-dependent portion of this second term $(1-p_{|00\rangle})^2$ is a multiplicative term:

$$\left[\eta_s^{log_2(M)}\right]^2.$$

When $P_{gen}$ is small, the first term in Eq. (11), $1-(1-P_{gen})^M\approx MP_{gen}$. At $\eta_s=1/\sqrt{2}\approx0.707$, since $$\left[\eta_s^{log_2(M)}\right]^2 = 1/M,$$

$P_{success}$ becomes insensitive to M. When $\eta_s\le1/\sqrt{2}$, $P_{success}$ decreases as M increases, whereas for $\eta_s>1/\sqrt{2}$, $P_{success}$ increases as M increases.

Figure 7:
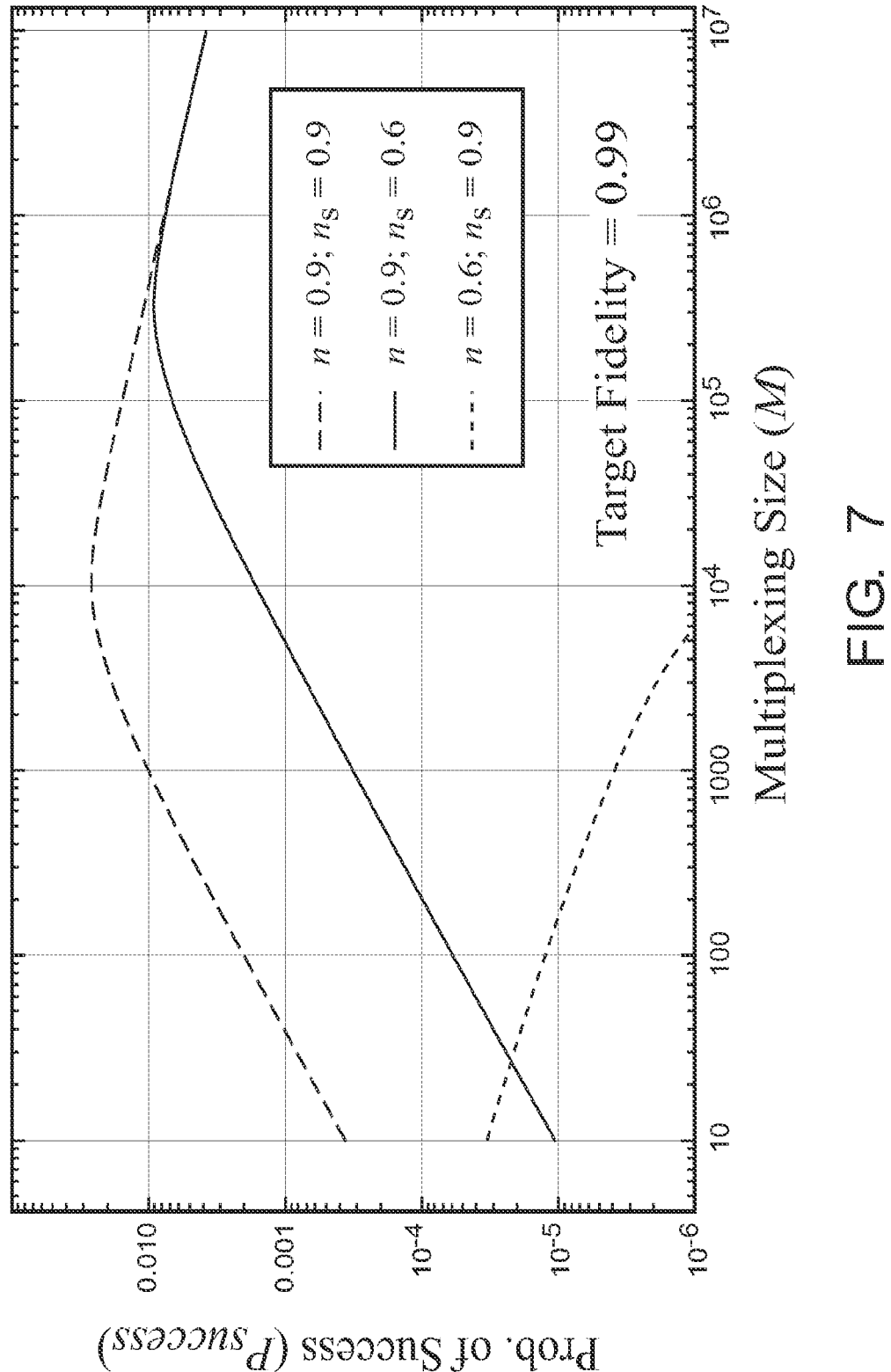
FIG. 7 is a plot of the success probability as a function of the multiplexing size (M) for a target Fidelity of 0.99.

FIG. 7 shows a plot of $P_{success}$ as a function of M for a given Fidelity target (=0.99). We see that for one of the plots, for which a lower $\eta_s$ was chosen, $P_{success}$ decreases as M increases, as discussed above. Further, we examine how the $P_{success}$ as a function of M behaves in the regime of high $\eta_s$. We observe that for every ($\eta$, $\eta_s$) combination, where $\eta_s>1/\sqrt{2}$, $P_{success}$ is maximized for an optimal value of M. This optimal value of M increases as we increase the target fidelity.

The above analysis does not account for non-zero $P_d$. We observe that the inclusion of detector dark clicks ($P_d>0$) only restricts the maximum achievable Fidelity.

In summary, we have shown that combining two free-running SPDC-based polarization-entangled sources with a linear-optical BSM built using PNR detectors for detecting modes of respective outputs from the two sources produces an entangled state whose fidelity can be pushed close to unity for implementations that include a heralded quantum memory that is able to filter out the vacuum contribution. This is generally not possible with a stand-alone free-running SPDC-based source due to the contributions from the high-order photon terms. Furthermore, we have described implementations in which the BSM provides a heralding trigger (also not available in a stand-alone free-running SPDC-based source), which enables implementations that use multiplexing of multiple heralded entanglement sources with a photonic switch array.

An alternative embodiment of a heralded-multiplexed entanglement source uses a version of the idealized quantum memory (IQM), wherein along with the previously stated characteristics of the IQM, the IQM is additionally able to emit the stored qubit into the photonic domain, encoded in the dual-rail basis. This alternative quantum memory would likely come with an additional efficiency cost (due to inefficiency in that storage qubit-to-photon readout process).

Figure 8:
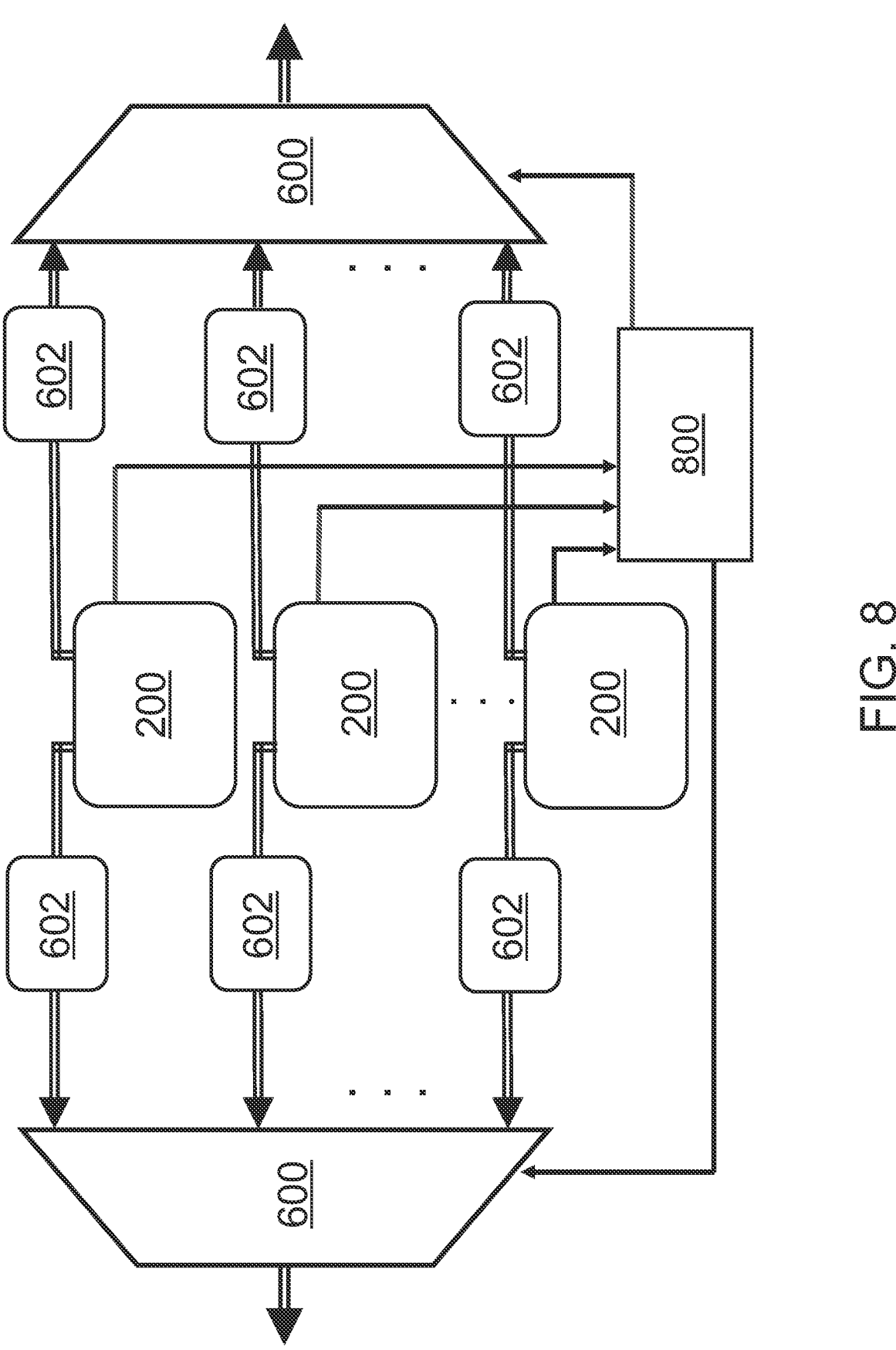
FIG. 8 is a schematic diagram of a heralded-multiplexed entanglement source.

FIG. 8 shows an example heralded-multiplexed entanglement source. We multiplex the outputs of the M heralded entanglement sources 200 with a vacuum ornot (VON) projective measurement performed by the quantum memory 602. The heralding triggers are sent to the control module 604, which additionally accounts for the vacuum output from each quantum memory 602. The optical switching arrays 600 output the state of one of the successful heralded entanglement source in any time slot, assuming one or more succeeds in that time slot.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. An apparatus for generating at least two entangled optical outputs, the apparatus comprising:

one or more heralded entanglement sources, each heralded entanglement source comprising:

a first free-running entanglement source providing a first optical output comprising a quantum superposition of first and second orthogonal optical modes, and a second optical output comprising a quantum superposition of third and fourth orthogonal optical modes, entangled with the first optical output;

a second free-running entanglement source providing a third optical output comprising a quantum superposition of fifth and sixth orthogonal optical modes, and a fourth optical output comprising a quantum superposition of seventh and eighth orthogonal optical modes, entangled with the third optical output;

one or more beam splitters configured to combine the first optical mode and the fifth optical mode and combine the second optical mode and the sixth optical mode;

two or more optical detectors configured to detect a first output of the one or more beam splitters and generate a first detection signal in a series of time slots, detect a second output of the one or more beam splitters and generate a second detection signal in the series of time slots, detect a third output of the one or more beam splitters and generate a third detection signal in the series of time slots, and detect a fourth output of the one or more beam splitters and generate a fourth detection signal in the series of time slots;

a trigger module configured to generate a trigger signal based on the first, second, third, and fourth detection signals to indicate one or more time slots in which the second optical output and the fourth optical output, provided from respective output ports of that heralded entanglement source, are entangled with each other.

2. The apparatus of claim 1, wherein each of the first and second free-running entanglement source comprises:

a nonlinear optical medium that is arranged to generate a first converted photon and a second converted photon from a first direction based on conversion from a first set of one or more pump photons, and is arranged to generate a third converted photon and a fourth converted photon from a second direction based on conversion from a second set of one or more pump photons; and cross-coupling optics configured to provide a pair of entangled optical outputs based on directing paths of the first and third converted photons to a first output port of that free-running entanglement source and directing paths of the second and fourth converted photons to a second output port of that free-running entanglement source.

3. The apparatus of claim 2, wherein each of the first and second free-running entanglement sources is pumped by a common pump source.

4. The apparatus of claim 2, wherein the first and second free-running entanglement sources each have a nonlinear optical medium that is a different portion of a common nonlinear optical crystal.

5. The apparatus of claim 2, wherein, if the first and second converted photons are generated, a sum of frequencies of the first converted photon and the second converted photon is equal to a sum of frequencies of the one or more pump photons of the first set; or if the third and fourth converted photon are generated, a sum of frequencies of the third converted photon and the fourth converted photon is equal to a sum of frequencies of the one or more pump photons of the second set.

6. The apparatus of claim 1, wherein the respective output ports of that heralded entanglement source have a physical separation of less than 1 meter.

7. The apparatus of claim 1, comprising a plurality of the heralded entanglement sources.

8. The apparatus of claim 7, further comprising:

a first optical multiplexer configured to combine first output ports of each of the heralded entanglement sources into a first multiplexed output;

a second optical multiplexer configured to combine second output ports of each of the heralded entanglement sources into a second multiplexed output; and a controller configured to control the first and second optical multiplexers based on respective trigger signals generated by the plurality of heralded entanglement sources.

9. The apparatus of claim 8, further comprising quantum memory modules at respective multiplexed outputs of each of the optical multiplexers.

10. The apparatus of claim 8, further comprising quantum memory modules at respective outputs of each of the heralded entanglement sources.

11. The apparatus of claim 1, wherein the two or more optical detectors are each configured to generate a binary detection signal that distinguishes a detected photon number equal to one for a first binary state from a detected photon number not equal to one for a second binary state.

12. The apparatus of claim 1, wherein the orthogonal optical modes of the first optical output are one of: orthogonal polarization modes, orthogonal temporal modes, orthogonal spectral modes, or orthogonal spatial modes.

13. A method for generating at least two entangled optical outputs from one or more heralded entanglement sources, the method comprising:

for each of the one or more heralded entanglement sources:

providing from a first free-running entanglement source a first optical output comprising a quantum superposition of first and second orthogonal optical modes, and a second optical output comprising a quantum superposition of third and fourth orthogonal optical modes, entangled with the first optical output;

providing from a second free-running entanglement source a third optical output comprising a quantum superposition of fifth and sixth orthogonal optical modes, and a fourth optical output comprising a quantum superposition of seventh and eighth orthogonal optical modes, entangled with the third optical output;

combining, using at least one beam splitter, the first optical mode and the fifth optical mode;

combining, using at least one beam splitter, the second optical mode and the sixth optical mode;

detecting, using two or more optical detectors, a first output of the one or more beam splitters to generate a first detection signal in a series of time slots, a second output of the one or more beam splitters to generate a second detection signal in the series of time slots, a third output of the one or more beam splitters to generate a third detection signal in the series of time slots, and a fourth output of the one or more beam splitters to generate a fourth detection signal in the series of time slots; and generating, using a trigger module, a trigger signal based on the first, second, third, and fourth detection signals to indicate one or more time slots in which the second optical output and the fourth optical output, provided from respective output ports of that heralded entanglement source, are entangled with each other.

14. The method of claim 13, wherein the one or more heralded entanglement sources comprise a plurality of heralded entanglement sources, and the method further comprises:

combining, using a first optical multiplexer, first output ports of each of the heralded entanglement sources into a first multiplexed output;

combining, using a second optical multiplexer, second output ports of each of the heralded entanglement sources into a second multiplexed output; and controlling the first and second optical multiplexers based on respective trigger signals generated by the plurality of heralded entanglement sources.

15. An apparatus for generating at least two entangled optical outputs, the apparatus comprising:

one or more heralded entanglement sources, each heralded entanglement source comprising:

a first free-running entanglement source providing a first optical output comprising a quantum superposition of a pair of orthogonal optical modes, and a second optical output comprising a quantum superposition of a pair of orthogonal optical modes, entangled with the first optical output;

a second free-running entanglement source providing a third optical output comprising a quantum superposition of a pair of orthogonal optical modes, and a fourth optical output comprising a quantum superposition of a pair of orthogonal optical modes, entangled with the third optical output;

an optical module configured to perform an interferometric measurement based on optical interference between at least a portion of the first optical output and at least a portion of the third optical output, and to generate one or more detection signals based on the interferometric measurement in a series of time slots; and a trigger module configured to generate a trigger signal based on the one or more detection signals to indicate one or more time slots in which the second optical output and the fourth optical output, provided from respective output ports of that heralded entanglement source, are entangled with each other.

16. The apparatus of claim 15, wherein the interferometric measurement comprises a Bell state measurement.

17. The apparatus of claim 15, wherein the interferometric measurement comprises a passive optical interference based on a combination of optical modes from the one or more heralded entanglement sources in a beam splitter.

18. The apparatus of claim 15, wherein the interferometric measurement comprises an active optical interference based on a boosted optical interaction that includes at least one of: (1) a quadrature squeezing operation, or (2) combination of optical modes from the one or more heralded entanglement sources with one or more single photons from at least one single photon source.

19. An apparatus for generating at least two entangled optical outputs, the apparatus comprising:

a plurality of heralded entanglement sources, each heralded entanglement source comprising:

a first output port providing a first optical output comprising a quantum superposition of orthogonal optical modes, a second output port providing a second optical output comprising a quantum superposition of orthogonal optical modes, and a trigger module configured to generate a trigger signal to indicate one or more time slots in which the first optical output and the second optical output are entangled with each other;

a first optical multiplexer configured to combine first output ports of each of the heralded entanglement sources into a first multiplexed output;

a second optical multiplexer configured to combine second output ports of each of the heralded entanglement sources into a second multiplexed output; and a controller configured to control the first and second optical multiplexers based on respective trigger signals generated by the plurality of heralded entanglement sources.

20. The apparatus of claim 19, wherein each heralded entanglement source comprises an optical module configured to perform an interferometric measurement based on optical interference between at least a portion of an optical output from a first free-running entanglement source and an optical output from a second free-running entanglement source, and to generate one or more detection signals based on the interferometric measurement in a series of time slots.

* * * * *